(12) United States Patent
Terada et al.

(10) Patent No.: US 7,724,984 B2
(45) Date of Patent: May 25, 2010

(54) IMAGE PROCESSING APPARATUS

(75) Inventors: Kengo Terada, Osaka (JP); Eiji Otomura, Osaka (JP); Kouji Nakajima, Kyoto (JP); Akira Sakamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 935 days.

(21) Appl. No.: 11/463,979

(22) Filed: Aug. 11, 2006

(65) Prior Publication Data

US 2007/0076246 A1  Apr. 5, 2007

(30) Foreign Application Priority Data

Aug. 24, 2005  (JP) ............................. 2005-243416

(51) Int. Cl.
*G06K 9/40* (2006.01)

(52) U.S. Cl. ..................... 382/304; 382/302; 382/305

(58) Field of Classification Search ................ 382/303, 382/304, 307
See application file for complete search history.

(56) References Cited

U.S. PATENT DOCUMENTS

| 6,122,712 | A | 9/2000 | Torii | |
|---|---|---|---|---|
| 6,961,153 | B1 * | 11/2005 | Hidaka | 358/468 |
| 6,993,114 | B2 * | 1/2006 | Takasawa | 378/98.5 |
| 7,068,846 | B1 * | 6/2006 | Yaguchi | 382/232 |
| 7,099,042 | B2 * | 8/2006 | Yaguchi | 358/1.9 |
| 7,233,406 | B2 * | 6/2007 | Ogura | 358/1.14 |

FOREIGN PATENT DOCUMENTS

JP   2003-241983   8/2003

OTHER PUBLICATIONS

English language Abstract of JP 2003-241983.

* cited by examiner

*Primary Examiner*—Yosef Kassa
(74) *Attorney, Agent, or Firm*—Greenblum & Bernstein P.L.C.

(57) ABSTRACT

An image processing apparatus of the invention includes: a plurality of processing units which share image processing; a parameter memory unit which holds a parameter specifying an operation of each of the processing units; and a control unit which controls the plurality of processing units, and the control unit includes: a sequence management unit which activates each of the processing units according to a sequence indicating a sequence of activation of and completion of processing by each of the processing units, and confirms completion of the processing; and a parameter setting unit which, in advance of activation of each of the processing units by the sequence management unit, reads a parameter for each processing unit to be activated, from the parameter memory unit according to a memory map indicating an address of the parameter for the processing unit, and sets the parameter to the processing unit according to the read result.

20 Claims, 35 Drawing Sheets

FIG. 4

Sequence (1)

| Order | Processing content |
|---|---|
| 1 | Activation of processing unit A |
| 2 | Activation of processing unit B |
| 3 | Waiting for processing completion of processing unit A |
| 4 | Activation of processing unit C |
| 5 | Waiting for processing completion of processing unit B |
| 6 | Activation of processing unit D |
| 7 | Waiting for processing completion of processing unit C |
| 8 | Waiting for processing completion of processing unit D |

Sequence (2)

| Order | Processing content |
|---|---|
| 1 | Activation of processing unit B |
| 2 | Activation of processing unit A |
| 3 | Waiting for processing completion of processing unit B |
| 4 | Activation of processing unit D |
| 5 | Waiting for processing completion of processing unit A |
| 6 | Activation of processing unit C |
| 7 | Waiting for processing completion of processing unit D |
| 8 | Waiting for processing completion of processing unit C |

Sequence (3)

| Order | Processing content |
|---|---|
| 1 | Activation of processing unit A |
| 2 | Waiting for processing completion of processing unit A |
| 3 | Activation of processing unit C |
| 4 | Waiting for processing completion of processing unit C |

FIG. 5

Memory map (1)

| Address | Memory content | Target processing unit |
|---|---|---|
| 0x000 | Input image start address | Processing unit A |
| 0x004 | Output image start address | Processing unit A |
| 0x008 | Computing mode | Processing unit A |
| 0x00c | Input image start address | Processing unit B |
| 0x010 | Address offset of input pixel | Processing unit B |
| 0x014 | Output image start address | Processing unit B |
| 0x018 | Address offset of output pixel | Processing unit B |
| 0x01c | Input image start address | Processing unit C |
| 0x020 | Output image start address | Processing unit C |
| 0x024 | Filter coefficient | Processing unit C |
| 0x028 | Input image start address | Processing unit D |
| 0x02c | Output image start address | Processing unit D |

Memory map (2)

| Address | Memory content | Target processing unit |
|---|---|---|
| 0x000 | Input image start address | Processing unit A |
| 0x004 | Output image start address | Processing unit A |
| 0x008 | Address offset of input pixel | Processing unit B |
| 0x00c | Address offset of output pixel | Processing unit B |
| 0x010 | Input image start address | Processing unit C |
| 0x014 | Output image start address | Processing unit C |
| 0x018 | Input image start address | Processing unit D |
| 0x01c | Output image start address | Processing unit D |

Memory map (3)

| Address | Memory content | Target processing unit |
|---|---|---|
| 0x000 | Input image start address | Processing unit A |
| 0x004 | Output image start address | Processing unit A |
| 0x008 | Computing mode | Processing unit A |
| 0x00c | Input image start address | Processing unit C |
| 0x010 | Output image start address | Processing unit C |
| 0x014 | Filter coefficient | Processing unit C |

FIG. 6

Interface of processing unit A

| Resister number | setting content |
|---|---|
| 0 | Address obtained by shifting down input image start address by 4 bits in right direction |
| 1 | Computing mode |
| 2 | Address obtained by shifting down output image start address by 4 bits in right direction |

1020

Interface of processing unit B

| Resister number | setting content |
|---|---|
| 0 | Address obtained by shifting down input image start address by 4 bits in right direction |
| 1 | Address offset of input pixel |
| 2 | Address obtained by shifting down input image start address by 4 bits in right direction |
| 3 | Address offset of output pixel |

1021

Interface of processing unit C

| Resister number | setting content |
|---|---|
| 0 | Address obtained by shifting down input image start address by 4 bits in right direction |
| 1 | Filter coefficient |
| 2 | Address obtained by shifting down output image start address by 4 bits in right direction |

1022

Interface of processing unit C

| Resister number | setting content |
|---|---|
| 0 | Address obtained by shifting down input image start address by 4 bits in right direction |
| 1 | Address obtained by shifting down input image start address by 4 bits in right direction |

Memory map (1) — 1030

| Address | Memory content | Target processing unit |
|---|---|---|
| 0x000 | Sequence identifier | — |
| 0x004 | Memory map identifier | — |
| 0x008 | Input image start address | Processing unit A |
| 0x00c | Output image start address | Processing unit A |
| 0x010 | Computing mode | Processing unit A |
| 0x014 | Input image start address | Processing unit B |
| 0x018 | Address offset of input pixel | Processing unit B |
| 0x01c | Output image start address | Processing unit B |
| 0x020 | Address offset of output pixel | Processing unit B |
| 0x024 | Input image start address | Processing unit C |
| 0x028 | Output image start address | Processing unit C |
| 0x02c | Filter coefficient | Processing unit C |
| 0x030 | Input image start address | Processing unit D |
| 0x034 | Output image start address | Processing unit D |

Memory map (2) — 1031

| Address | Memory content | Target processing unit |
|---|---|---|
| 0x000 | Sequence identifier | — |
| 0x004 | Memory map identifier | — |
| 0x008 | Input image start address | Processing unit A |
| 0x00c | Output image start address | Processing unit A |
| 0x010 | Address offset of input pixel | Processing unit B |
| 0x014 | Address offset of output pixel | Processing unit B |
| 0x018 | Input image start address | Processing unit C |
| 0x01c | Output image start address | Processing unit C |
| 0x020 | Input image start address | Processing unit D |
| 0x024 | Output image start address | Processing unit D |

Memory map (3) — 1032

| Address | Memory content | Target processing unit |
|---|---|---|
| 0x000 | Sequence identifier | — |
| 0x004 | Memory map identifier | — |
| 0x008 | Input image start address | Processing unit A |
| 0x00c | Output image start address | Processing unit A |
| 0x010 | Computing mode | Processing unit A |
| 0x014 | Input image start address | Processing unit C |
| 0x018 | Output image start address | Processing unit C |
| 0x01c | Filter coefficient | Processing unit C |

FIG. 12

Identifier determination table 1035 / 302

| Processing identifier | Sequence | Memory map |
|---|---|---|
| 1 | 1 | 1 |
| 2 | 2 | 1 |
| 3 | 3 | 3 |
| 4 | 1 | 2 |
| 5 | 2 | 2 |

FIG. 13

Memory map (1) — 115

| Address | Memory content | Target processing unit |
|---|---|---|
| 0x000 | Processing identifier | — |
| 0x004 | Input image start address | Processing unit A |
| 0x008 | Output image start address | Processing unit A |
| 0x00c | Computing mode | Processing unit A |
| 0x010 | Input image start address | Processing unit B |
| 0x014 | Address offset of input pixel | Processing unit B |
| 0x018 | Output image start address | Processing unit B |
| 0x01c | Address offset of output pixel | Processing unit B |
| 0x020 | Input image start address | Processing unit C |
| 0x024 | Output image start address | Processing unit C |
| 0x028 | Filter coefficient | Processing unit C |
| 0x02c | Input image start address | Processing unit D |
| 0x030 | Output image start address | Processing unit D |

1040

Memory map (2)

| Address | Memory content | Target processing unit |
|---|---|---|
| 0x000 | Processing identifier | — |
| 0x004 | Input image start address | Processing unit A |
| 0x008 | Output image start address | Processing unit A |
| 0x00c | Address offset of input pixel | Processing unit B |
| 0x010 | Address offset of output pixel | Processing unit B |
| 0x014 | Input image start address | Processing unit C |
| 0x018 | Output image start address | Processing unit C |
| 0x01c | Input image start address | Processing unit D |
| 0x020 | Output image start address | Processing unit D |

1041

Memory map (3)

| Address | Memory content | Target processing unit |
|---|---|---|
| 0x000 | Processing identifier | — |
| 0x004 | Input image start address | Processing unit A |
| 0x008 | Output image start address | Processing unit A |
| 0x00c | Computing mode | Processing unit A |
| 0x010 | Input image start address | Processing unit C |
| 0x014 | Output image start address | Processing unit C |
| 0x018 | Filter coefficient | Processing unit C |

Sequence (1) — 401

| Order | Processing content | Activation number |
|---|---|---|
| 1 | Parameter setting for processing unit A | 1 |
| 2 | Waiting for completion of parameter setting for processing unit A | — |
| 3 | Processing unit A activation request | 1 |
| 4 | Parameter setting for processing unit B | — |
| 5 | Waiting for completion of parameter setting for processing unit B | — |
| 6 | Processing unit B activation request | 2 |
| 7 | Waiting for processing completion of processing unit A | — |
| 8 | Parameter setting for processing unit A | 2 |
| 9 | Waiting for completion of parameter setting for processing unit A | — |
| 10 | Processing unit A activation request | 2 |
| 11 | Parameter setting for processing unit B | — |
| 12 | Waiting for completion of parameter setting for processing unit B | — |
| 13 | Waiting for processing completion of processing unit B | — |
| 14 | Processing unit B activation request | 1 |
| 15 | Parameter setting for processing unit C | — |
| 16 | Waiting for completion of parameter setting for processing unit A | — |
| 17 | Waiting for processing completion of parameter setting for processing unit C | — |
| 18 | Processing unit C activation request | 1 |
| 19 | Parameter setting for processing unit D | — |
| 20 | Waiting for processing completion of processing unit B | — |
| 21 | Waiting for completion of parameter setting for processing unit D | — |
| 22 | Processing unit D activation request | — |
| 23 | Waiting for processing completion of processing unit C | — |
| 24 | Waiting for processing completion of processing unit D | — |

Memory map (1) — 402

| Address | Memory content | Target processing unit | Activation number |
|---|---|---|---|
| 0x000 | Input image start address | Processing unit A | 1 |
| 0x004 | Output image start address | Processing unit A | 1 |
| 0x008 | Computing mode | Processing unit A | 1 |
| 0x00c | Input image start address | Processing unit A | 2 |
| 0x010 | Output image start address | Processing unit A | 2 |
| 0x014 | Computing mode | Processing unit A | 2 |
| 0x018 | Input image start address | Processing unit B | 1 |
| 0x01c | Address offset of input pixel | Processing unit B | 1 |
| 0x020 | Output image start address | Processing unit B | 1 |
| 0x024 | Address offset of output pixel | Processing unit B | 1 |
| 0x028 | Input image start address | Processing unit B | 2 |
| 0x02c | Address offset of input pixel | Processing unit B | 2 |
| 0x030 | Output image start address | Processing unit B | 2 |
| 0x034 | Address offset of output pixel | Processing unit B | 2 |
| 0x038 | Input image start address | Processing unit C | 1 |
| 0x03c | Output image start address | Processing unit C | 1 |
| 0x040 | Filter coefficient | Processing unit C | 1 |
| 0x044 | Input image start address | Processing unit D | 1 |
| 0x048 | Output image start address | Processing unit D | 1 |

1060

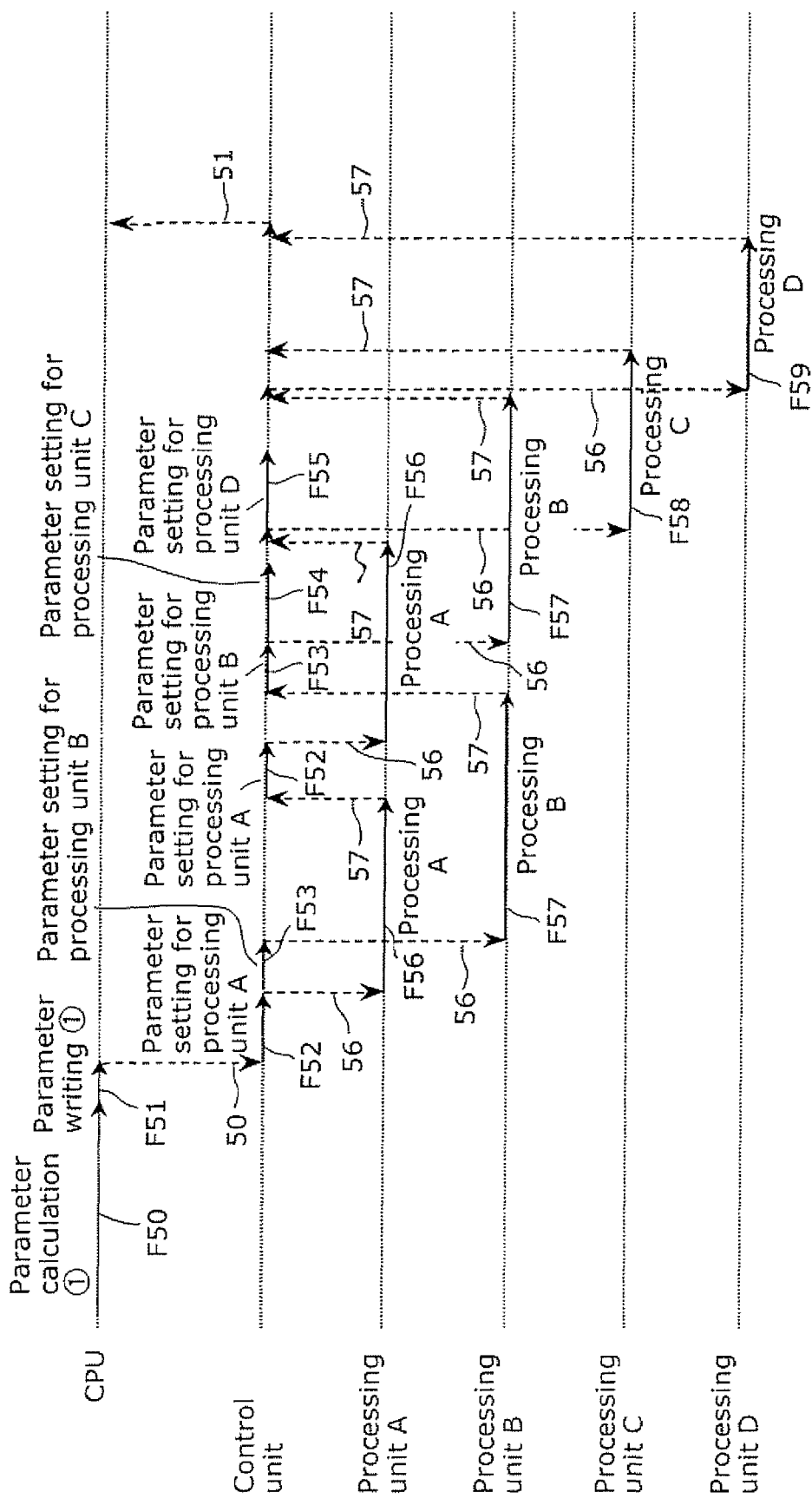

FIG. 19

| Completion dependence table | | | | | |
|---|---|---|---|---|---|
| Completion necessary processing unit | Processing unit A | Processing unit B | Processing unit C | Processing unit D | |
| | — | — | Processing unit B | Processing unit D | |
| | | | Processing unit A | Processing unit B | 1072 |

FIG. 20

Completion flag table

| Processing unit A | Processing unit B | Processing unit C | Processing unit D |
|---|---|---|---|
| Completed | Completed | Uncompleted | Uncompleted |

Completion dependence table 501

| Completion necessary processing unit | Processing unit A | Processing unit B | Processing unit C | Processing unit D |
|---|---|---|---|---|
| | — | Processing unit A | Processing unit A | Processing unit C |
| | | | Processing unit B | 1080 |

FIG. 26

Priority table 601
(higher priority with larger numeric value)

| | Processing unit A | Processing unit B | Processing unit C | Processing unit D |
|---|---|---|---|---|
| Priority | 2 | 0 | 1 | 0 |

State dependence table 701

| Activation condition | Processing unit A | Processing unit B | Processing unit C | Processing unit D |
|---|---|---|---|---|
| 1 | — | — | Processing of processing unit A is completed | Processing of processing unit B is completed |
| 2 | — | — | not (Processing of processing unit D is being performed) | not (Processing of processing unit C is being performed) |

State flag table

| Processing unit A | Processing unit B | Processing unit C | Processing unit D |
|---|---|---|---|
| Processing completed | Processing being performed | Pre-processing | Pre-processing |

Completion dependence table 1100

| Completion necessary processing unit | Processing unit A | Processing unit B | Processing unit C | Processing unit D |
|---|---|---|---|---|
| | — | — | Processing unit C | Processing unit D |
| | — | — | Processing unit A | Processing unit B |

Processing time table

| Processing unit A | Processing unit B | Processing unit C | Processing unit D |
|---|---|---|---|
| 30 cycles | 20 cycles | 25 cycles | 30 cycles |

FIG. 35

Sequence

| Order | Processing content |
|---|---|
| 1 | Activation of processing unit A |
| 2 | Activation of processing unit B |
| 3 | Waiting for processing completion of processing unit B |
| 4 | Activation of processing unit C |
| 5 | Waiting for processing completion of processing unit A |
| 6 | Activation of processing unit D |
| 7 | Waiting for processing completion of processing unit C |
| 8 | Waiting for processing completion of processing unit D |

IMAGE PROCESSING APPARATUS

BACKGROUND OF THE INVENTION (1) Field of the Invention

The present invention relates to an image processing apparatus used for image filtering processing, an image codec and the like.

(2) Description of the Related Art

With the significant technological progress of digital video equipments in recent years, there are increasing opportunities to perform image processing such as image compression/decompression processing and filtering. In the case of performing such image processing, an image processing apparatus is often used in which processing is divided and the divided processing operations are performed in parallel in a plurality of processing units. However, in the middle of the technological competition, such an image processing apparatus is strictly restricted in terms of processing performance and an amount of memory used, and the image processing is increasing in complexity along with the technological progress.

In the case of parallel operations of the plurality of processing units as described above, conventionally, a CPU controls each of the processing units. The CPU also calculates a parameter necessary for operation of each of the processing units, and set the parameter to each of the processing units. For enhancing the processing performance, interrupt is generated to the CPU upon each processing completion of the processing units, and the CPU subsequently performs parameter setting and making an activation request for a processing unit to be activated next.

The problem here lies in that, since the CPU controls each of the processing units, interrupt is generated to the CPU upon each processing completion of the processing units, which causes deterioration in processing performance in parameter calculation and parameter setting by the CPU. Further, the CPU has a heavy load because of performing processing of parameter calculation, parameter setting, activation order control and synchronous control for each of the processing units, which may slow down the rate of processing performance of the entire system according to that of the CPU.

Further, more parallel operations of the CPU and the processing units are required for improvement in processing performance of the system. However, it is necessary for the CPU and the processing units to operate in synchronization with each other, e.g. the CPU needs to wait for processing completion of the processing unit before performing parameter setting and making an activation request for the processing unit, thereby making it difficult to improve the parallelism.

Further, there are often cases where the processing unit is converted for improving the processing performance of the system or reducing power consumption. In such cases, a CPU program needs to be changed at each change in interface of the processing unit, and hence the compatibility of the CPU program is low. There are also cases where each of the processing units is intended to be operated more parallely for the purpose of improving the processing performance. In such cases, the order of activation of each of the processing units is often intended to be converted based upon a band width of a data transfer bus or performance of each of the processing units. Also in such cases, there is the problem of low compatibility of the CPU program.

In Japanese Patent Laid-Open No. 2003-241983, each of the processing units by itself reads a parameter for next activation from a memory at the time of processing completion of the processing unit, and successively operates based upon the parameter, to reduce a load on the CPU processing. In an apparatus according to Japanese Laid-Open Patent Application No. 2003-241983, parameters are set from a CPU to a memory, and an activation request is made to the processing unit after completion of all the settings. A mechanism for reading a parameter from the memory is present in every processing unit, and the processing unit reads the parameter by itself and successively repeats the processing, Further, the apparatus is provided with a synchronous mechanism where the parameter has a synchronous bit therein and the processing unit is held in a waiting state until processing completion of another processing unit according to the state of the synchronous bit in the parameter.

According to this technique, there is no need for the CPU to perform parameter setting and control on each of the processing units, leading to reduction in load on the CPU.

SUMMARY OF THE INVENTION

However, the above-mentioned method requires every processing unit to have a parameter reading mechanism, which increases address management scale, data lines, and the like, resulting in an increase in circuit scale. Further, an arbitration mechanism is required for the case of simultaneous accesses of a plurality of processing units to a memory where parameters are stored.

Moreover, since synchronization among the processing units is performed in every processing unit, each of the processing units needs to operate while managing states of the other processing units. For the management of states of the other processing units, a signal line needs to be added to between the processing units, which necessitates control of state update timing and the like, leading to an increase in overhead of the processing units.

Further, the processing unit reads a parameter from the memory and sets the read value as it is to a resister for performing processing. When the interface of the processing unit is changed, a CPU program for setting parameters needs to be changed. Moreover, even when the order of activation of each processing unit is intended to be changed, the CPU program needs to be changed, thereby reducing the compatibility of the CPU program.

Further, after waiting for processing completion of each of the processing units, the CPU writes the parameter into the memory, and subsequently notifies an activation request to another processing unit. Therefore, the CPU needs to operate in synchronization with processing completion of each of the processing units, which makes it difficult to improve the parallelism between the CPU and each of the processing units.

Further, the parameter setting is performed to each of the processing units immediately before activation thereof, thereby requiring time until start of actual processing.

It is an object of the present invention to provide an image processing apparatus in which a circuit scale is reduced and an overhead of each of the processing units is reduced, to improve the processing efficiency.

An image processing apparatus of the present invention for solving the above-mentioned problems includes: a plurality of processing units which share image processing; a memory unit which holds a parameter specifying an operation of each of the processing units; and a control unit which controls the plurality of processing units, wherein the control unit includes: a sequence management unit which holds a sequence table indicating a sequence of activation of and completion of processing by each of the processing units, to activate each of the processing units according to the sequence table, and confirms completion of processing by each of the processing units; and a parameter setting unit which holds a memory map indicating an address of a parameter for each of the processing units, and in advance of activation of each of the processing units by the sequence management unit, reads a parameter for each processing unit to be activated, from the memory unit according to the memory map, and sets the parameter to the processing unit according to the read result.

According to this configuration, the control unit reads and sets parameters of all processing units, thereby enabling reduction in circuit scale. Namely, all the processing units need neither to read parameters by themselves from the memory unit, nor to include a memory reading mechanism and arbitration mechanism, thereby enabling reduction in circuit scale of each of the processing units.

Further, the processing speed can be improved. A first reason for this is that the control unit performs synchronization among the processing units, to reduce overhead of the processing units. Namely, each of the processing units does not need to manage a state of another processing unit so that the overhead of the processing units, such as control of state update timing, decreases. A second reason is that the control unit makes the processing units successively operate image processing indicated by the sequence without assistance of a CPU as a host of the image processing apparatus. Namely, the CPU can execute parameter calculation for a next sequence without interrupt during operations of the control unit and each of the processing units, thereby improving the processing efficiency.

Here, the parameter setting unit may further convert the parameter read from the memory unit so as to comply with an interface of the processing unit, and set the converted parameter to the processing unit.

According to this configuration, since the parameter setting unit converts a parameter read from the memory unit so as to comply with the interface of each of the processing units, even when the interface of the processing unit is changed, the change does not affect a CPU program, thereby allowing enhancement in compatibility of the CPU program. Further, since the activation order of the processing units is managed by means of the sequence, even when the activation order of the processing units is changed, only the sequence needs to be changed, the change does not affect the CPU program, thereby allowing enhancement in compatibility of the CPU program.

Here, the sequence management unit may hold a plurality of kinds of the sequence tables, select a sequence table according to a sequence identifier inputted from the outside, activate each of the processing units according to the selected sequence table, and confirm completion of the processing.

According to this configuration, since a plurality of sequence tables can be selectively switched based upon a sequence identifier from the CPU, the sequence management unit does not need to load a new sequence table in each case of executing image processing required for a plurality of kinds of sequence tables, thereby enabling improvement in processing speed.

Here, the memory unit may include: a plurality of memory regions each of which holds a parameter corresponding to a sequence; and a selection unit which selects a memory region for a writing target in a predetermined order among the memory regions, and selects a memory region for a reading target in a predetermined order among the memory regions.

According to this configuration, the memory region is made switchable from the CPU to allow a change in the memory map, thereby permitting the effective use of the memory region. Further, when arrangements of parameters are different among each of sequences in a system which operates by switching the sequences, the memory map is switched along with the sequence table to eliminate the need for ensuring the memory region in each of the sequences.

Here, the control unit may further include an activation notification unit which queues activation signals from the outside, each of the activation signals directing start of execution of the sequence, and notifies the sequence management unit of the queued activation signals one by one.

According to this configuration, the queuing function of the activation signal of the control unit is realized by the activation notification unit so that the CPU can notify a next activation signal to the control unit without waiting for the completion signal from the control unit, thereby improving the parallelism among the CPU, the control unit and each of the processing units, to improve the processing speed. Further, since the queuing function can be realized by a simple mechanism of counting the activation signal of the control unit, the queuing number can be converted with ease.

Here, the parameter setting unit may hold a plurality of the memory maps, and select a memory map according to a memory map identifier inputted from the outside.

Here, the memory unit may hold sequence identifiers corresponding to parameters, and the sequence management unit may read a sequence identifier from the memory unit, select a sequence table according to the identifier, activate each of the processing units according to the selected sequence table, and confirm completion of the processing.

According to this configuration, the control unit acquires a sequence identifier for sequence switching through the memory unit, to eliminate the need for adding data lines between the CPU and the control unit, thereby enabling an attempt to simplify the apparatus.

Here, the memory unit may hold memory map identifiers corresponding to parameters, and the sequence management unit may read a memory map identifier from the memory unit and select a memory map according to the identifier.

According to this configuration, the control unit acquires the sequence identifier for sequence switching and the memory map identifier for memory map switching through the memory unit, to eliminate the need for adding data lines between the CPU and the control unit, thereby enabling an attempt to simplify the apparatus.

Here, the control unit may further include an identifier determination unit which holds a table indicating the corresponding relation among processing identifiers, sequence identifiers and memory map identifiers, and determines a sequence identifier and a memory map identifier which correspond to a processing identifier from the outside, the sequence management unit may select a sequence table corresponding to the sequence identifier determined by the identifier determination unit, and the parameter setting unit may select a memory map corresponding to the memory map identifier determined by the identifier determination unit.

According to this configuration, provision of the identifier determination unit for determining a sequence identifier and a memory map identifier based on one processing identifier makes the sequence and the parameter map switchable with small pieces of information, thereby allowing reduction in data transfer amount from the CPU. In a system in which the memory map is frequently converted along with the sequence, it is possible to alleviate the load of specifying an identifier applied upon the CPU.

Here, when one sequence includes plural activations of the same processing unit, the sequence table and the memory map may include information for reading a different parameter to the same processing unit.

According to this configuration, it is possible to easily deal with the case of activating the same processing unit plural number of times.

Here, the sequence table may indicate, for the plurality of processing units, the order of parameter setting, confirmation of completion of parameter setting, activation, and confirmation of completion of processing.

According to this configuration, the sequence table indicates the above order, to make the parameter setting by the parameter setting unit and each of the processing units operable in parallel, thereby enabling improvement in processing performance of the entire system.

Here, a sequence generation unit which generates a sequence according to information indicating an activation condition of the processing unit may be included.

According to this configuration, the sequence generation unit is capable of automatically generating a sequence, thereby alleviating the load of forming a sequence.

Here, the control unit may include: a sequence management unit which holds a completion dependence table indicating processing completion of another processing unit as an activation condition of the processing unit, activates each of the processing units according to the completion dependence table, and confirms completion of the processing; and a parameter setting unit which holds a memory map indicating an address of a parameter for each of the processing units, and in advance of activation of each of the processing units by the sequence management unit, reads a parameter for each processing unit to be activated, from the memory unit according to the memory map, and set the parameter to the processing unit according to the read result.

According to this configuration, it is possible to dynamically change the activation order of each of the processing units on the timing of processing completion of the control unit according to the completion dependence table, so as to shorten idle time of the processing units, thereby allowing improvement in processing performance.

Here, the sequence management unit may hold priority of each of the processing units, and activate the processing units in the order of the priority when the activation conditions according to the completion dependence table are identical.

According to this configuration, each of the processing units is provided with priority, and the processing units are activated in the order of the priority when the activation conditions are the same, to make it possible to shorten processing time of the entire system, thereby allowing improvement in processing performance.

Here, the control unit may include: a sequence management unit which holds a state dependence table indicating a state of another processing unit as an activation condition of the processing unit, activates each of the processing units according to the state dependence table, and confirm completion of the processing; and a parameter setting unit which reads a parameter from the memory unit according to a memory map indicating an address of a parameter corresponding to each processing unit to be activated, to convert the parameter so as to comply with an interface of the processing unit, and to set the converted parameter to the processing unit.

According to this configuration, since states other than completed states of the processing units can be determined based upon the state dependence table, it is possible to produce a more flexible activation condition so as to shorten processing time of the entire system, leading to improvement in processing performance.

According to the image processing apparatus of the present invention, the circuit scale of each of the processing units can be reduced. Further, the processing speed can be improved. Namely, the overhead of the processing units can be reduced to improve the parallelism between the control unit and the processing units.

The CPU is capable of executing parameter calculation for a next sequence without interrupt during operations of the control unit and each of the processing units, so as to improve the processing efficiency.

Even when the interface of the processing unit is changed, the change does not affect the CPU program, thereby enabling enhancement in compatibility of the CPU program.

FURTHER INFORMATION ABOUT TECHNICAL BACKGROUND TO THIS APPLICATION

The disclosure of Japanese Patent Application No. 2005-243416 filed on Aug. 24, 2005 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 4 is a view showing sequences in Embodiment 1 of the present invention;

FIG. 5 is a view showing memory maps in Embodiment 1 of the present invention;

FIG. 6 is a view showing interfaces of processing units in Embodiment 1 of the present invention;

FIG. 10 is a view showing memory maps in Embodiment 2 of the present invention;

FIG. 12 is a view showing an identifier determination table in Embodiment 3 of the present invention;

FIG. 13 is a view showing memory maps in Embodiment 3 of the present invention;

FIG. 15 is a view showing one sequence for plural activations in Embodiment 4 of the present invention;

FIG. 16 is a view showing one memory map for plural activations in Embodiment 4 of the present invention;

FIG. 17 is a view showing operational timings of a CPU, a control unit, and each of processing units in Embodiment 4 of the present invention;

FIG. 19 is a view showing a completion dependence table in Embodiment 5 of the present invention.

FIG. 20 is a view showing a completion flag table in Embodiment 5 of the present invention;

FIG. 25 is a view showing a completion dependence table in Embodiment 6 of the present invention;

FIG. 26 is a view showing a priority table in Embodiment 6 of the present invention;

FIG. 29 is a view shoeing a state dependence table in Embodiment 7 of the present invention;

FIG. 30 is a view showing a state flag table in Embodiment 7 of the present invention;

FIG. 32 is a view showing a state dependence table in Embodiment 8 of the present invention;

FIG. 33 is a view showing a processing time table in Embodiment. 8 of the present invention;

FIG. 35 is a view showing a formed sequence in Embodiment 8 of the present invention.

DESCRIPTION OF THE PREFERRED EMBODIMENT(S)

In the following, embodiments of image processing apparatuses according to the present invention are described with reference to drawings.

Embodiment 1

Figure 1:
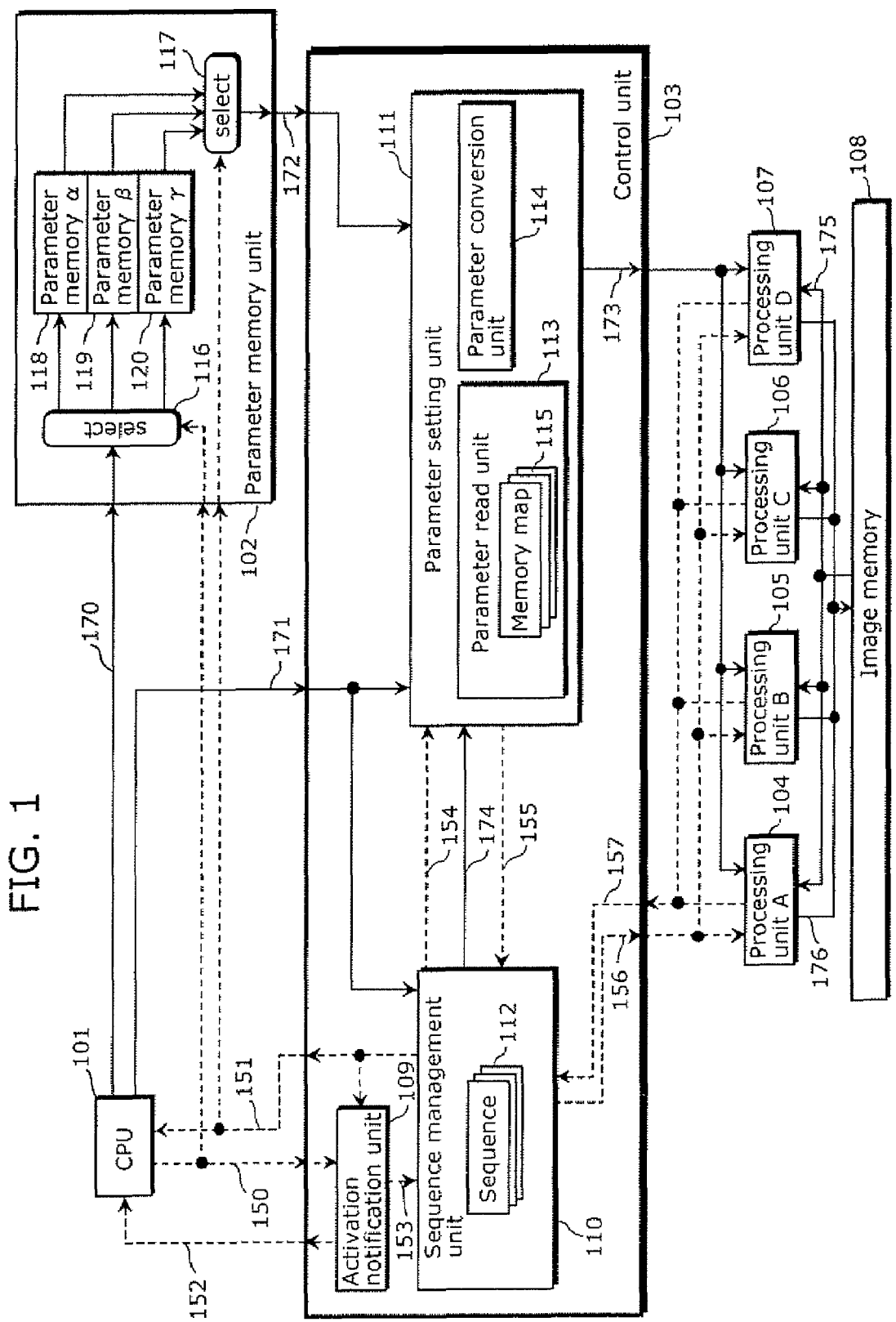
FIG. 1 is a block diagram showing a configuration of an image processing apparatus in Embodiment 1 of the present invention.

FIG. 1 is a block diagram showing a configuration of an image processing apparatus in Embodiment 1 of the present invention. This image processing apparatus comprises a CPU 101, a parameter memory unit 102, a control unit 103, a processing unit A104, a processing unit B105, a processing unit C106, a processing unit D107, and a memory 108. These components may form one chip of a system LSI or the components excluding the memory 108 may form one chip. The parameter memory unit 102 comprises three memory regions (parameter memory α118, parameter memory β119, parameter memory γ120), a data write selector 116, and a data read selector 117. The control unit 103 comprises an activation notification unit 109, a sequence management unit 110, and a parameter setting unit 111.

The CPU 101 calculates parameters necessary in operations of the processing unit A104, the processing unit B105, the processing unit C106 and the processing unit D107, and the parameters are transferred to the parameter memory unit 102 through the use of a data line 170 for parameter transfer Further, the control unit 103 is controlled by means of a control unit activation signal 150 and a data line 171 for transfer of a sequence identifier and a memory map identifier.

The parameter memory unit 102 stores the parameters calculated by the CPU 101. Three parameter memories are present in the parameter memory unit 102. The data write selector 116 selects one parameter memory from the three parameter memories. The selected parameter memory, into which data is to be written, is switched by means of a control unit activation signal 150. Further, the data read selector 117 selects one parameter memory from the three parameter memories. The selected parameter, from which data is to be read, is switched by means of a control unit completion signal 151. The switching operation is performed in the order of parameter memories α118→β119→γ120→α118→β119→γ120→ . . . For example, when the data write selector 116 selects the parameter memory α118 so that data is writtten into the parameter memory α118, upon receipt of the control unit activation signal 150, the data write selector 116 selects the parameter memory β119 so that data is written into the parameter memory β119 the next time. It should be noted that, at first, the data write selector 116 and the data read selector 117 are both set to perform writing and reading operations with respect to the parameter memory α118.

The control unit 103 comprises a sequence management unit 110 for performing sequence management of each of the processing units, a parameter setting unit 111 for setting a parameter of each of the processing units, and an activation notification unit 109 for queuing the control unit activation signal 150 from the CPU 101.

The sequence management unit 110 has a plurality of sequences 112 indicating the timing for activation of the processing unit and the timing for waiting for processing completion of the processing unit. Each of the sequences 112 may be a table. The sequence management unit 110 selects one sequence from among the plurality of sequences 112 based upon a sequence identifier specified by the CPU 101 through the data line 171 for transfer of a sequence identifier and a memory map identifier, and controls the parameter setting unit 111 and each of the processing units according to the selected sequence.

The parameter setting unit 111 comprises a parameter read unit 113 and a parameter conversion unit 114. The parameter read unit 113 has a plurality of memory maps 115 indicating which address of the parameter memory stores a parameter corresponding to each of the processing units, and selects one memory map out of the plurality of memory maps according to a memory map identifier specified by the CPU 101 through the data line 171 for transfer of a sequence identifier and a memory map identifier Upon receipt of a parameter setting request 154 from the sequence management unit 110, the parameter read unit 113 reads a parameter corresponding to the processing unit to be activated according to the selected memory map through the use of a data line 172 for transfer of a parameter in advance of conversion. The parameter conversion unit 114 converts the read parameter so as to comply with an interface of the processing unit to be activated, and sets the converted parameter to the processing unit to be activated.

Figure 2:
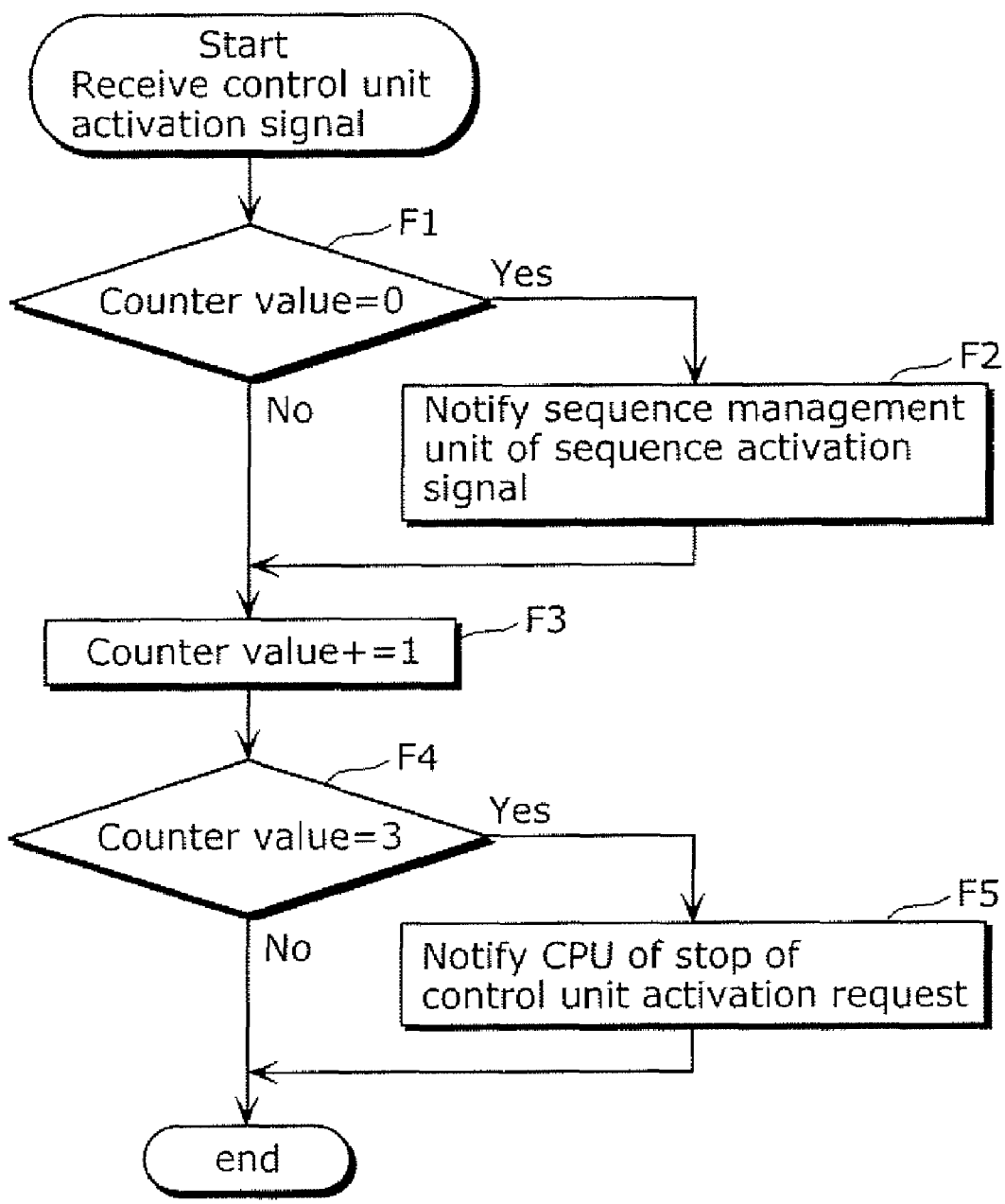
FIG. 2 is a flowchart showing operation of an activation notification unit at the time of receiving a control unit activation signal in Embodiments 1 to 8 of the present invention.
Figure 3:
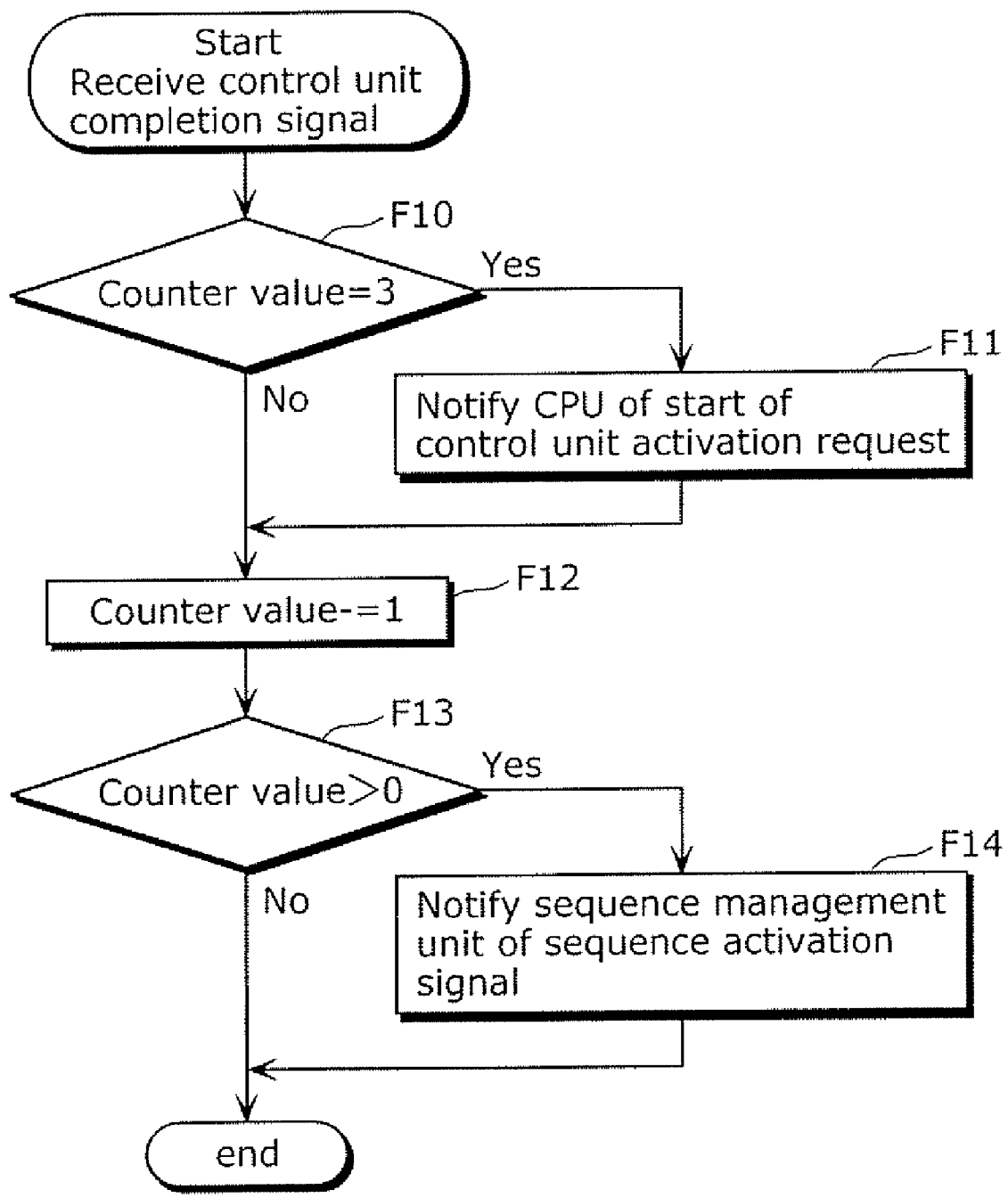
FIG. 3 is a flowchart showing operation of the activation notification unit at the time of receiving a control unit completion signal in Embodiments 1 to 8 of the present invention.

The activation notification unit 109 realizes the queuing function of the control unit activation signal 150. The operation of the activation notification unit 109 upon receipt of the control unit activation signal 150 is described with reference to FIG. 2. When the control unit activation signal is received, it is determined in F1 whether or not a counter value held inside the activation notification unit 109 is 0, and only when the counter value is 0, in F2, a sequence activation signal 153 is notified to the sequence management unit 110. Next, the counter value is incremented by one in F3, followed by determining in F4 whether or not the counter value is 3, and only when the counter value is 3, it is notified in F5 to the CPU 101 by means of an activation request control signal 152 that further queuing of the control unit activation signal 150 is impossible. The operation of the activation notification unit 109 upon receipt of the control unit completion signal 151 is described with reference to FIG. 3. When the control unit completion signal 151 is received, it is determined in F10 whether or not a counter value is 3, and only when the counter value is 3, it is notified in F11 to the CPU 101 by means of the activation request control signal 152 that the queuing of the control unit activation signal 150 has becomes possible. Next, the counter value is decremented by one in F12, and it is determined in F13 whether or not the counter value is larger than 0, and only when the counter value is larger than 0, in F14, the sequence activation signal 153 is notified to the sequence management unit 110. It should be noted that the counter value is set to 0 at the time of activation.

Each of the processing unit A104, the processing unit B105, the processing unit C106 and the processing unit D107 reads an input image from the image memory 108 through the use of a data line 175 for input image transfer, and performs processing peculiar to each of the processing units based upon the set parameters, when each processing unit receives a processing unit activation request 156 from the sequence management unit 110. Upon completion of the processing, the processing results are stored into the image memory 108 through the use of a data line 176 for output image transfer, and a processing unit completion notification 157 is notified to the sequence management unit 110.

FIGS. 4, 5, 6 show sequences, memory maps and interfaces of the processing performances in Embodiment 1. An operation performed in the case of selecting a sequence (1) 1000 and a memory map (1) 1010 is described. First, the CPU 101 calculates a parameter necessary for operation of each of the processing units, and the parameter is transferred to the parameter memory unit. In the parameter memory unit 102, the parameter is written into the parameter memory a118 according to the initial setting of the data write selector 116. Next, the CPU 101 specifies the sequence identifier as 1 and the memory map identifier as 1, and notifies the control unit activation signal 150 to the control unit 103. Upon receipt of the control unit activation signal 150, the activation notification unit 109 of the control unit 103 notifies the sequence activation signal 153 to the sequence management unit 110 since the initially set counter value is 0. Upon receipt of the sequence activation signal 153, the sequence management unit 110 selects the sequence (1) 1000 from the sequence identifier, and transfers the identifier of the processing unit A to a parameter setting request signal 154 through the use of a data line 174 for transfer of a processing unit identifier according to the sequence (1) 1000, and then notifies the parameter setting request signal 154 to the parameter setting unit 111. Upon receipt of the parameter setting request signal 154, the parameter setting unit 111 reads data of addresses 0x000 to 0x008 as parameters of the processing unit A104 from the parameter memory a118 through the use of the data line 172 for transfer of a parameter in advance of conversion according to the memory map (1) 1010 and the initial setting of the data read selector 117. The read parameters are converted by the parameter conversion unit 114 so as to comply with the interface of the processing unit A104. Specifically, a start address of an input image and a start address of an output image are both shifted to the right by 4 bits. The start address of the input image and the start address of the output image after the conversions are set to registers 0 and 2 of the processing unit A104 through the use of a data line 173 for transfer of a parameter after conversion, and a computing mode is set to a register 1 of the processing unit A104.

Upon completion of the parameter setting of the processing unit A104, the parameter setting unit 111 notifies a parameter setting completion signal 155 to the sequence management unit 110.

Upon receipt of the parameter setting completion signal 155, the sequence management unit 110 notifies the processing unit activation signal 156 to the processing unit A104. Upon receipt of the processing unit activation signal 156, the processing unit A104 starts processing according to the set parameter. Then, upon completion of the processing, the processing unit A104 notifies the processing unit completion notification 157 to the sequence management unit 110. Further, after notifying the processing unit activation signal 156 to the processing unit A104, the sequence management unit 110 makes a request for parameter setting and a request for activation for the processing unit B105. The control unit and each of the processing units are performed in parallel. While processing after the sequence (1) 1000 is omitted as being the same as the requests for parameter-setting and activation for the processing unit A104, when the sequence management unit 110 receives the processing unit completion notification 157 from the processing unit C106 as the final processing unit of the sequence (1) 1000, the sequence management unit 110 notifies the control unit completion signal 151 to the CPU 101.

Figure 7:
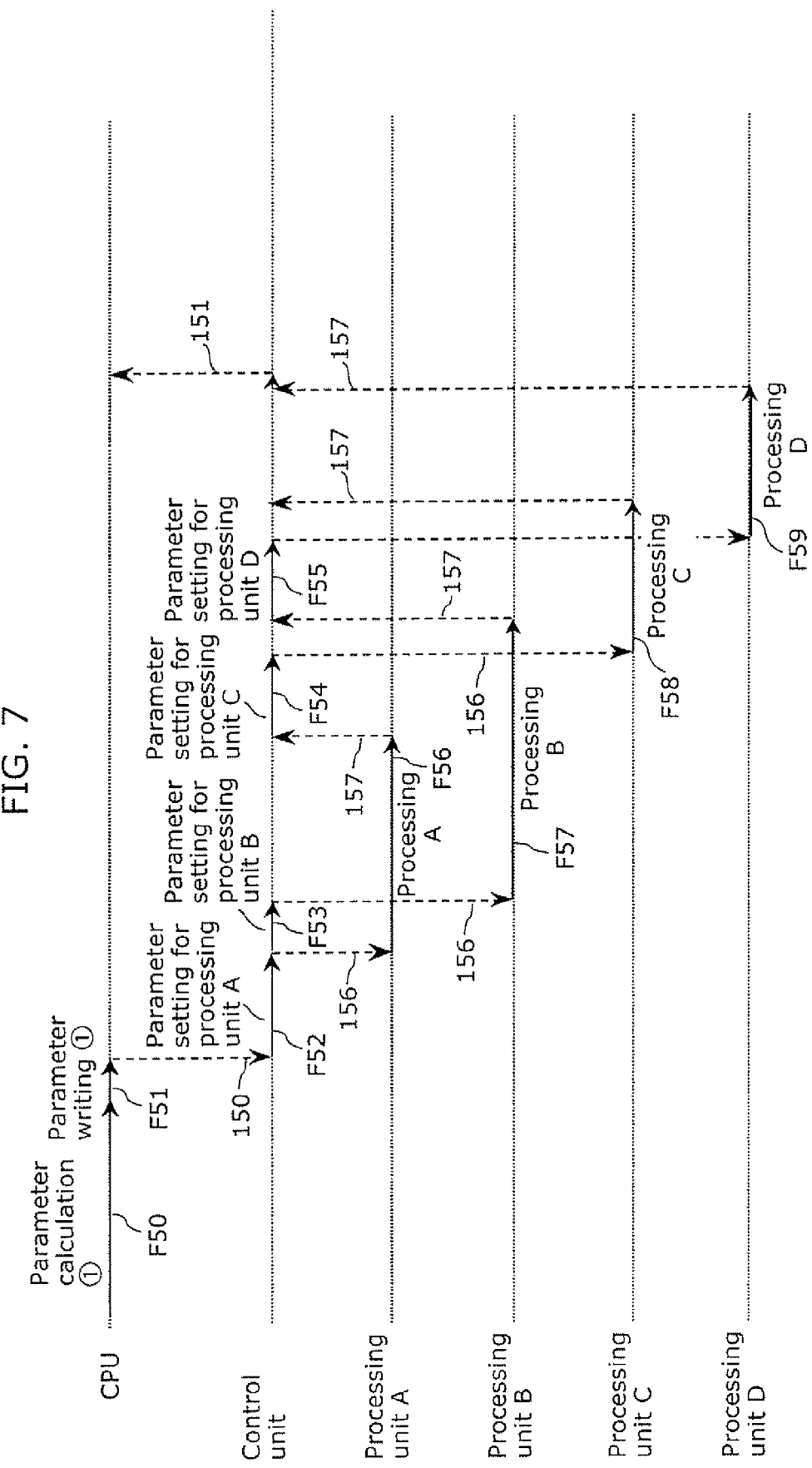
FIG. 7 is a view showing operational timings of a CPU, a control unit, and each of processing units in Embodiment 1 of the present invention.

FIG. 7 shows operations of the CPU 101, the control unit 103, the processing unit A104, the processing unit B105, the processing unit C106, and the processing unit D107 over time. The control unit 103 and each of the processing units are operable in parallel as in the case of F53 and F56, where parameter setting to the processing unit B in the control unit and, processing A in the processing unit A are performed in parallel.

Figure 8:
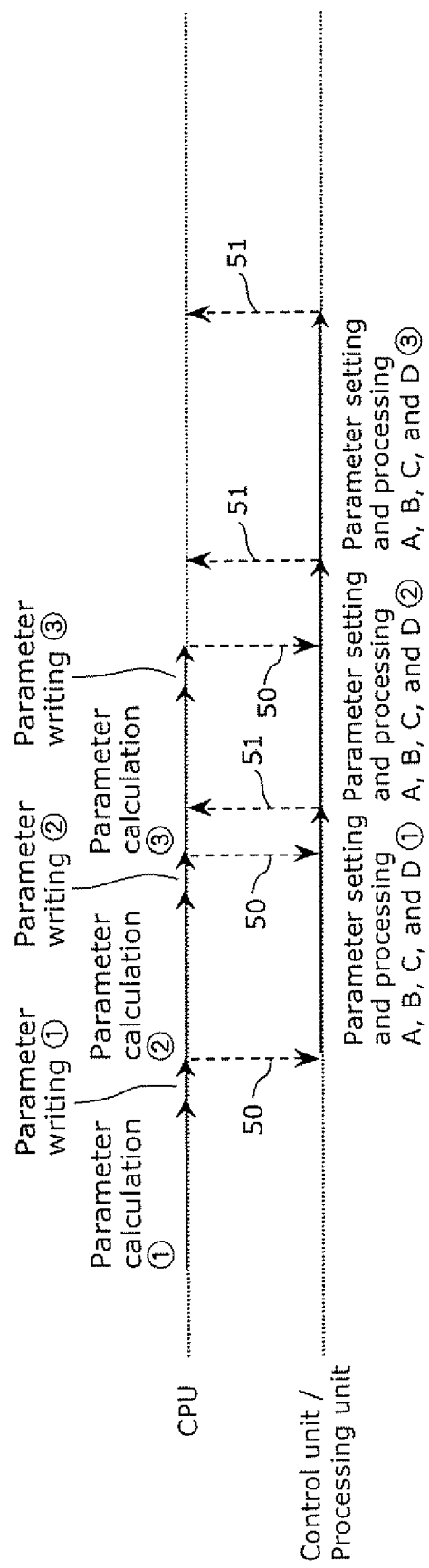
FIG. 8 is a view showing operational timings of the CPU and the control unit/processing unit at the time of successive operation in Embodiment 1 of the present invention.

It should be noted that the CPU 101, the control unit 103 and each of the processing units are also operable in parallel, and FIG. 8 shows the case of operating processing three consecutive times. Parameter calculation and parameter writing in the CPU 101 are operated in parallel with processing in the control unit and the processing unit without assistance of one another. When an image processing such as filtering is performed for one image, the one image is divided, and image processing is performed on each of the divided images. In such a case, the same processing is repeatedly performed the same number of times as the number of divided images. Also in the present embodiment, it is assumed that processing is repeated.

As thus described, according to the present embodiment, the control unit 103 performs sequence management and parameter setting of the processing units, to allow the processing unit to be consecutively operated without assistance of the CPU 101. This thus enables the CPU 101 to perform parameter calculation for a next processing unit during operations of the control unit 103 and the processing units without interrupt.

Further, since all parameters of the processing units are read from the parameter memory once in the control unit 103, it is not necessary for each of the processing units to provide a parameter read mechanism.

Further, since synchronization among the processing units is controlled by the sequence 112, a processing amount of the CPU 101 is not increased.

Further, the parameters read from the parameter memory are converted in the parameter conversion unit 114 so as to comply with the interface of each of the processing units, whereby even a change in the interface of the processing unit does not affect the CPU program, leading to enhancement in compatibility of the CPU program.

Further, the activation order of the processing unit is managed by means of the sequence 112 so that only the sequence 112 needs to be changed even with a change in the activation order of the processing unit and the change thus does not affect the CPU program, thereby enhancing the compatibility of the CPU program.

Further, a plurality of sequences 112 are made switchable by means of a sequence identifier from the CPU 101 so that a mechanism of reloading the sequence 112 is unnecessary even when the sequence 112 is intended to be switched, thereby leading to improvement in processing speed.

Further, a plurality of memory maps are made switchable by means of a plurality of memory map identifiers from the CPU 101, to make a variation in the memory map 115 allowable, thereby enabling the effective use of the memory region. Moreover, in the system operated by switching the sequence 112, when arrangement of the parameter is different among each of the sequences, the memory map 115 is switched along with the sequence 112, to eliminate the need for ensuring the memory region in each sequence.

Further, the data write selector 116 and the data read selector 117 are controlled by means of the control unit activation signal 150 and the control unit completion signal 151 and the parameter memory is switched so that the CPU 101 can write a parameter for next processing into the parameter memory without waiting for the control unit completion signal 151, to improve the parallelism among the CPU 101, the control unit 103 and each of the processing units, thereby leading to improvement in processing speed.

Further, the queuing function of the control unit activation signal 150 can be realized by the activation notification unit 109 so that the CPU 101 can notify the control unit activation signal 150 without waiting for the control unit completion signal 151, to improve the parallelism among the CPU 101, the control unit 103 and each of the processing units, thereby leading to improvement in processing speed. Moreover, the queuing function is realized by the mechanism of counting the control unit activation signal 150, to make the queuing number easily changeable.

It is to be noted that, while three kinds each of sequences 112 and memory maps 115 are present in Embodiment 1 for the sake of description, the system is not limited to this, but may comprise one kind each of sequence 112 and memory map 115 and may not comprise the mechanism of making a selection according to specification from the CPU.

Further, while the activation request control signal 152 is notified from the activation notification unit 109 to the CPU when the counter value is 3, by variation in this value, the queuing number of the control unit activation signal 150 can be varied. When the queuing function is unnecessary, the activation notification unit 109 may not be present. Further, while the number of parameter memories is 3, that is not restricted.

Embodiment 2

Figure 9:
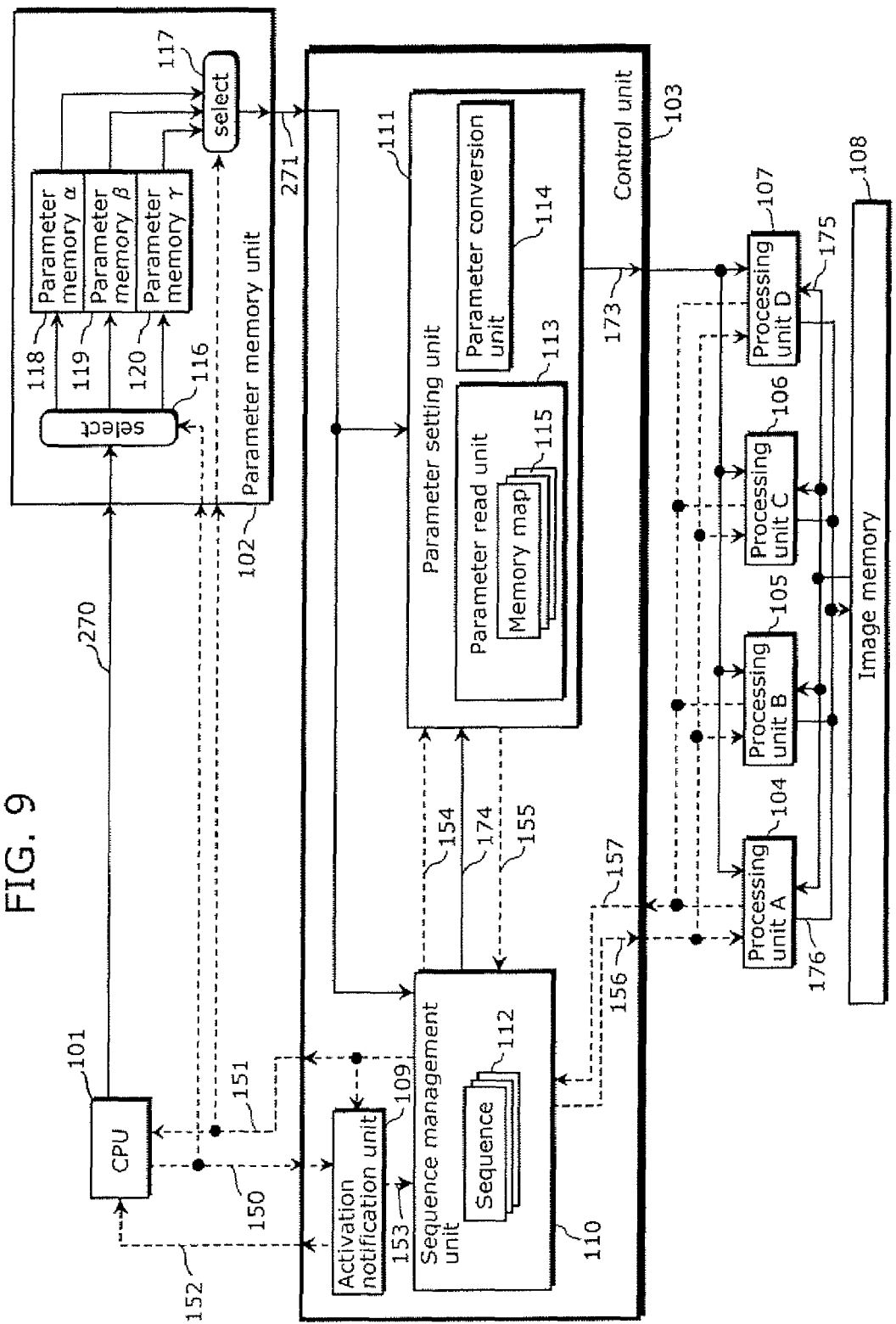
FIG. 9 is a block diagram showing a configuration of an image processing apparatus in Embodiment 2 of the present invention.

FIG. 9 shows a block diagram showing a configuration of an image processing apparatus in Embodiment 2 of the present invention. In FIG. 9, the same elements as in FIG. 1 are provided with the same symbols as in FIG. 1, and the description thereof is omitted. In Embodiment 2, the data line which transfers the sequence identifier and the memory map identifier directly from the CPU 101 to the control unit 103 is not present, but a data line is present which transfers the sequence identifier and the memory map identifier through the parameter memory unit 102.

The CPU 101 calculates a parameter necessary for operation of each of the processing units, and transfers the parameter to the parameter memory unit 102 through the use of a data line 270 for transfer of a parameter sequence identifier and a memory map identifier. Further, along with the parameter, the CPU 101 transfers the sequence identifier and the memory map identifier to the parameter memory unit 102.

Upon receipt of the sequence activation signal 153, the sequence management unit 110 reads a sequence identifier from S the parameter memory unit 102 through the use of a data line 271 for transfer of a sequence identifier and a memory map identifier in advance of conversion. Similarly, the parameter setting unit 111 reads a memory map identifier from the parameter memory unit 102 through the use of the data line 271 for transfer of a sequence identifier and a memory map identifier in advance of conversion. The sequence management unit 110 and the parameter setting unit select a sequence and a memory map from the read sequence identifier and memory map identifier, and operate according to the selected sequence and memory map. FIG. 10 shows a memory map in Embodiment 2. The sequence identifier is stored in the address 0x000 of the memory, and the memory map identifier is stored in the address 0x004.

By this configuration, there is no need for adding a data line to between the CPU 101 and the control unit 103, leading to simplification of the apparatus.

It should be noted that, while both the sequence identifier and the memory map identifier are transferred from the parameter memory unit 102 to the control unit 103 in Embodiment 2 for the sake of description, only either of the identifiers may be directly transferred from the CPU 101.

Embodiment 3

Figure 11:
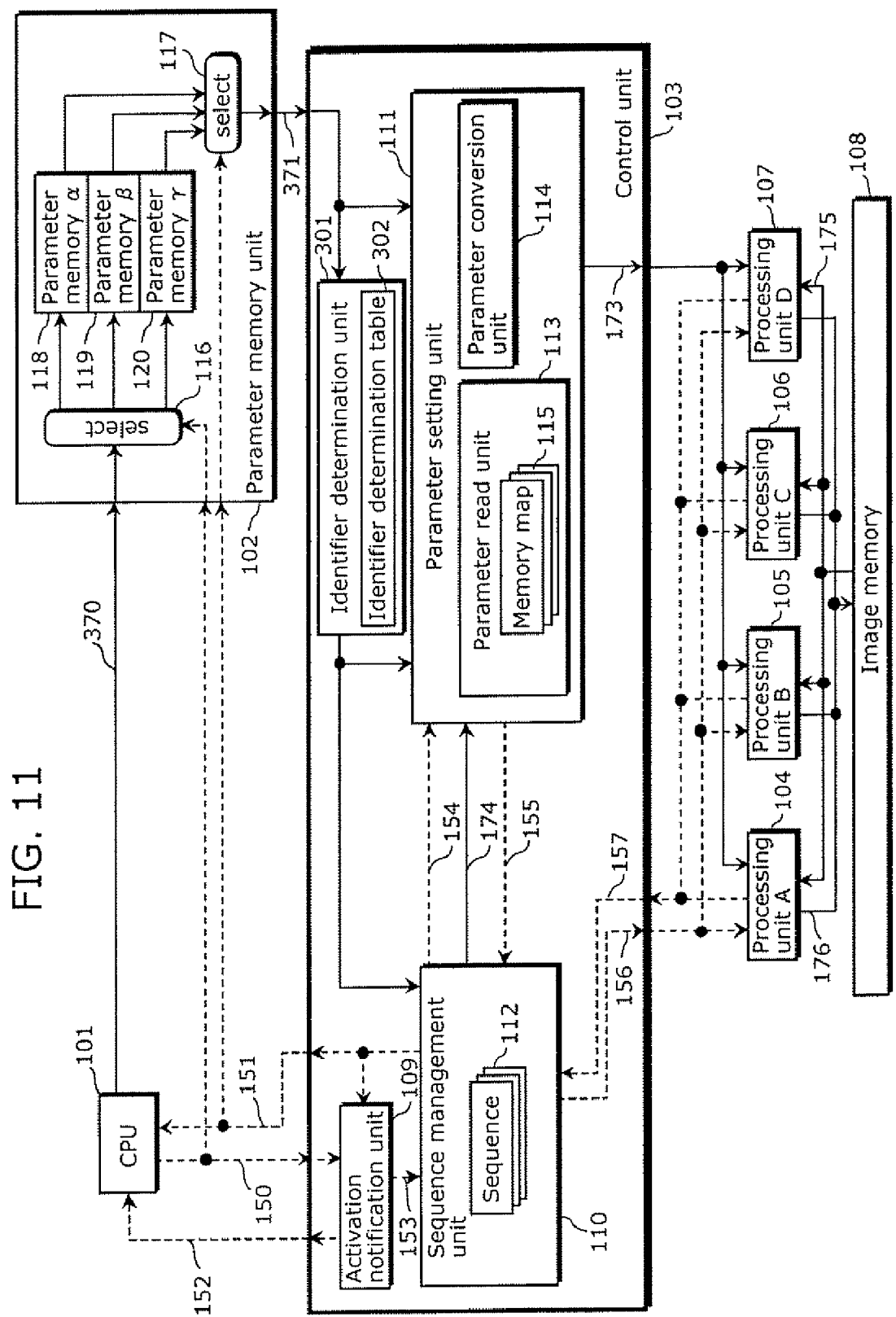
FIG. 11 is a block diagram showing a configuration of an image processing apparatus in Embodiment 3 of the present invention.

FIG. 11 is a block diagram showing a configuration of an image processing apparatus according to Embodiment 3 of the present invention. In FIG. 11, the same elements as in FIG. 9 are provided with the same symbols as in FIG. 9, and the description thereof is omitted. In Embodiment 3, an identifier determination unit 301 is present.

The CPU 101 calculates a parameter necessary for operation of each of the processing units, and transfers the parameter to the parameter memory unit through the use of a data line 370 for transfer of a parameter identifier and a processing identifier. Further, simultaneously with the parameter, the CPU 101 transfers a processing identifier to the parameter memory unit 102.

Upon receipt of the sequence activation signal 153, the sequence management unit 110 reads a processing identifier from the parameter memory unit 102 out to the identifier determination unit 301 through the use of a data line 371 for transfer of a sequence identifier and a memory map identifier in advance of conversion. The identifier determination unit 301 converts the processing identifier into a sequence identifier and a memory map identifier by means of an identifier determination table 302, and notifies the identifiers to the sequence management unit 110 and the parameter setting unit 111. The sequence management unit 110 and the parameter setting unit select a sequence 112 and a memory map from the notified sequence identifier and memory map identifier, and operate according to the selected sequence and memory map. FIG. 13 shows a memory map in Embodiment 3. The processing identifier is stored in the address 0x000 of the memory. FIG. 12 shows an identifier determination table 302. It is shown here a sequence (1) and a memory map (1) are selected using the processing identifier (1)

By this configuration, the sequence and the parameter memory are made switchable with a small piece of information, and it is thus possible to reduce a transfer amount from the CPU 101 to the parameter memory unit 102 and a transfer amount from the parameter memory unit 102 to the control unit 103. In a system as in Embodiment 3 in which the memory map is frequently converted along with the sequence 112, the reduction in transfer amount also leads to alleviation of the load of specifying a identifier which applies on the CPU 101.

Embodiment 4

Figure 14:
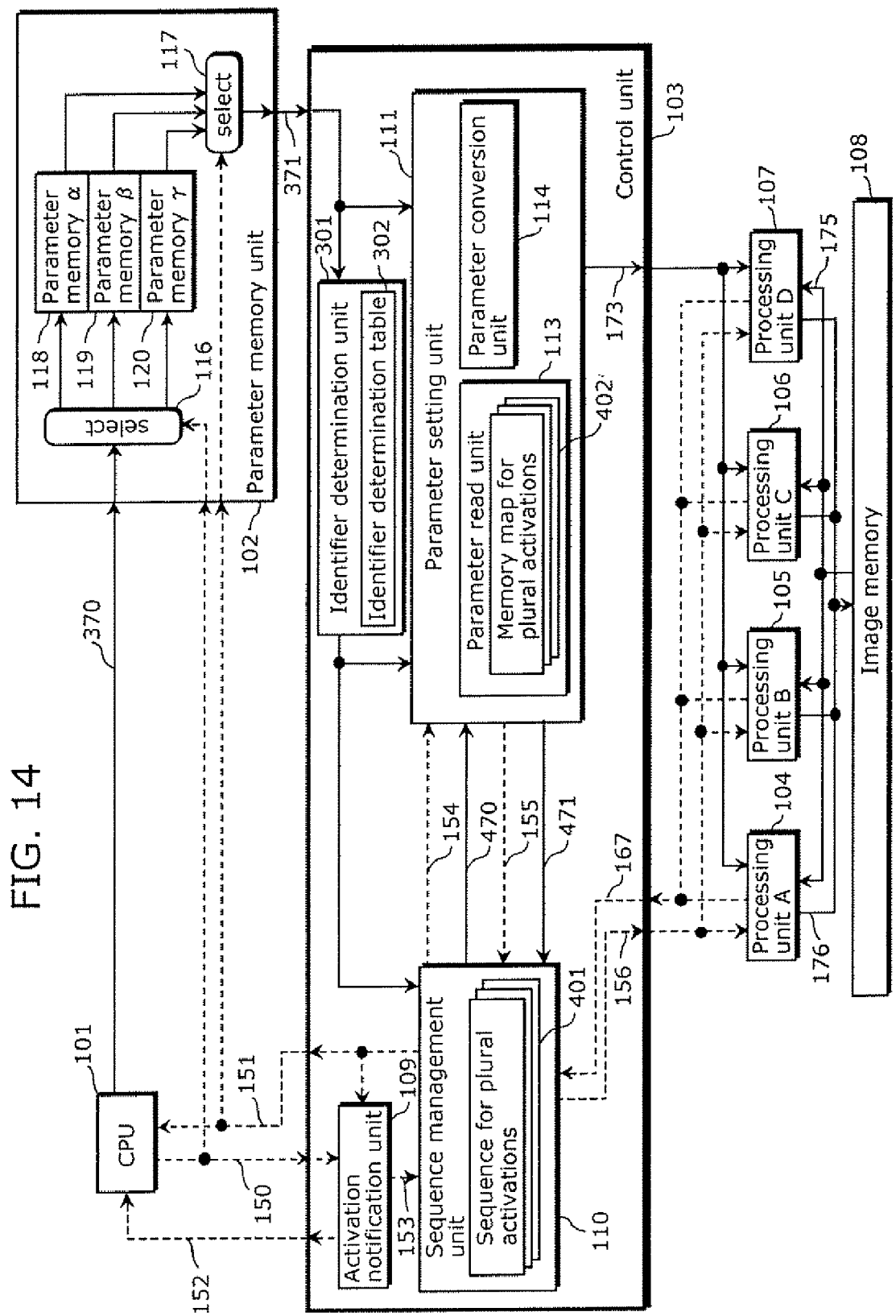
FIG. 14 is a block diagram showing a configuration of an image processing apparatus in Embodiment 4 of the present invention.

FIG. 14 is a block diagram showing a configuration of an image processing apparatus according to Embodiment 4 of the present invention. In FIG. 14, the same elements as in FIG. 11 are provided with the same symbols as in FIG. 11, and the description thereof is omitted. In Embodiment 4, a sequence 401 for plural activations and a memory map 402 for plural activations are present in place of the sequence 112 and the memory map 115.

The sequence 401 for plural activations controls the timing for parameter setting and the timing for waiting for parameter setting completion (confirmation of parameter setting completion), in addition to the timing for activation of the processing unit and the timing for waiting for processing completion of the processing unit. Further, the sequence 401 has information of activation numbers for dealing with plural activations of the same processing unit. At the time of setting the parameter, an activation number is transferred to the parameter setting unit 111 along with a processing unit identifier through the use of a data line 470 for transfer of a parameter setting processing unit identifier and an activation number.

The memory map 402 for plural activations has information of the activation numbers to deal with plural activations of the same processing unit, and reads a parameter corresponding to the activation number specified by the parameter setting unit 111.

FIGS. 15 and 16 show one sequence 401 for plural activations and one memory map 402 for plural activations in Embodiment 4. FIG. 17 shows operations of the CPU 101, the control unit 103, the processing unit A104, the processing unit B105, the processing unit C106 and the processing unit D107 over time in the case of selecting the sequence (1) 1050 for plural activations and the memory map (1) 1050 for plural activations. As shown in FIG. 17, parameter setting F54 of the processing unit C, processing A (F56) and processing B (F57) are operated in parallel, while parameter setting F55 of the processing unit D, processing B (F57) and processing C (F58) are operated in parallel, and it is therefore found that the parallelism has bee improved.

As thus described, the activation of the processing unit in the sequence is divided into parameter setting and an activation request, and those are made performable on separate timings, to allow parallel operations of the parameter setting and the processing units, thereby improving the processing performance of the entire system.

Further, the activation numbers are added to the parameter setting portion of the sequence and the memory map, and it is thereby easy to deal with a case where the same processing unit is intended to be activated plural number of times.

It is to be noted that, two techniques: a technique for dividing activation of the processing unit in the sequence into parameter setting and an activation request; and a technique for activating the same processing unit plural number of times according to an activation number, are combined for description in Embodiment 4, but either one of the techniques may be applied to the system.

Embodiment 5

Figure 18:
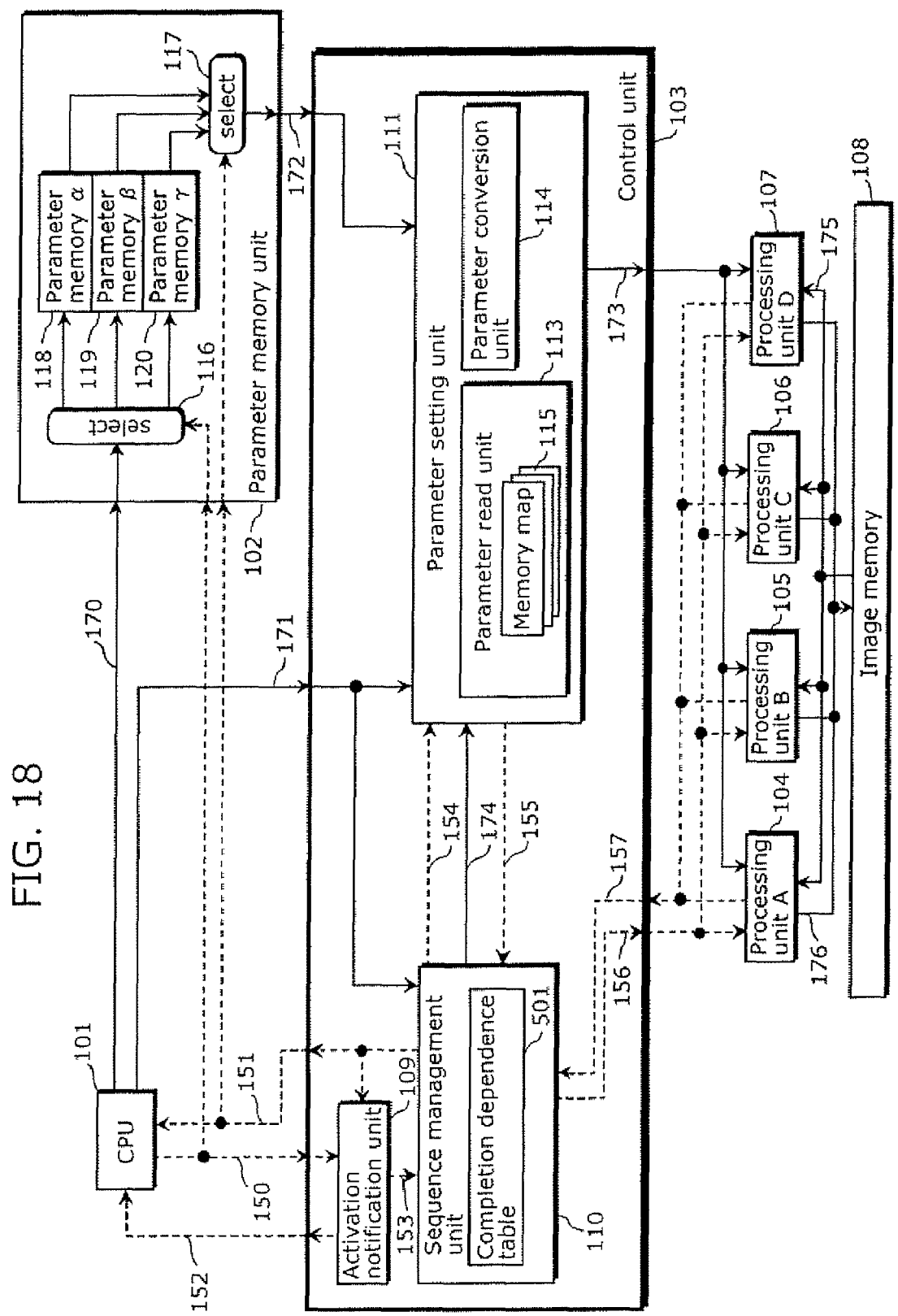
FIG. 18 is a block diagram showing a configuration of an image processing apparatus in Embodiment 5 of the present invention.

FIG. 18 is a block diagram showing a configuration of an image processing apparatus according to Embodiment 5 of the present invention. In FIG. 18, the same elements as in FIG. 1 are provided with the same symbols as in FIG. 1, and the description thereof is omitted. In Embodiment 5, the sequence 112 is not present while a completion dependence table 501 is present.

The completion dependence table 501 is a table showing a dependence relation among the processing units in which processing completion of the processing unit A104 is a condition for activation of the processing unit C106, and the sequence management unit 110 activates a processing unit which satisfies the activation condition by means of the completion dependence table 501. FIG. 19 shows the completion dependence table 501. A completion necessary processing unit is a processing unit as an activation condition, and the processing unit cannot be activated unless processing of the completion necessary processing unit is completed. For example, the processing unit C106 cannot be activated until processing of the processing unit A104 is completed. In addition, it is shown that the processing unit indicated with "−" in the completion necessary processing unit column is the processing unit without its completion necessary processing unit. Further, whether or not processing of the completion necessary processing unit has been completed is determined by means of a completion flag table stored inside the sequence management unit. The completion flag table is updated every time the sequence management unit 110 receives the processing unit completion notification 157, and a processing unit with its processing completed is in a completed state whereas a processing unit with its processing uncompleted is in an uncompleted state. It is to be noted that the completion flag table is initiated when the sequence management unit 110 receives the sequence activation signal 153, and all the processing unit is brought into the uncompleted state. FIG. 20 shows a completion flag table in a case where processing of the processing unit A104 and the processing unit B105 have been completed and processing of the processing unit C106 and the processing unit D107 are not completed.

Figure 21:
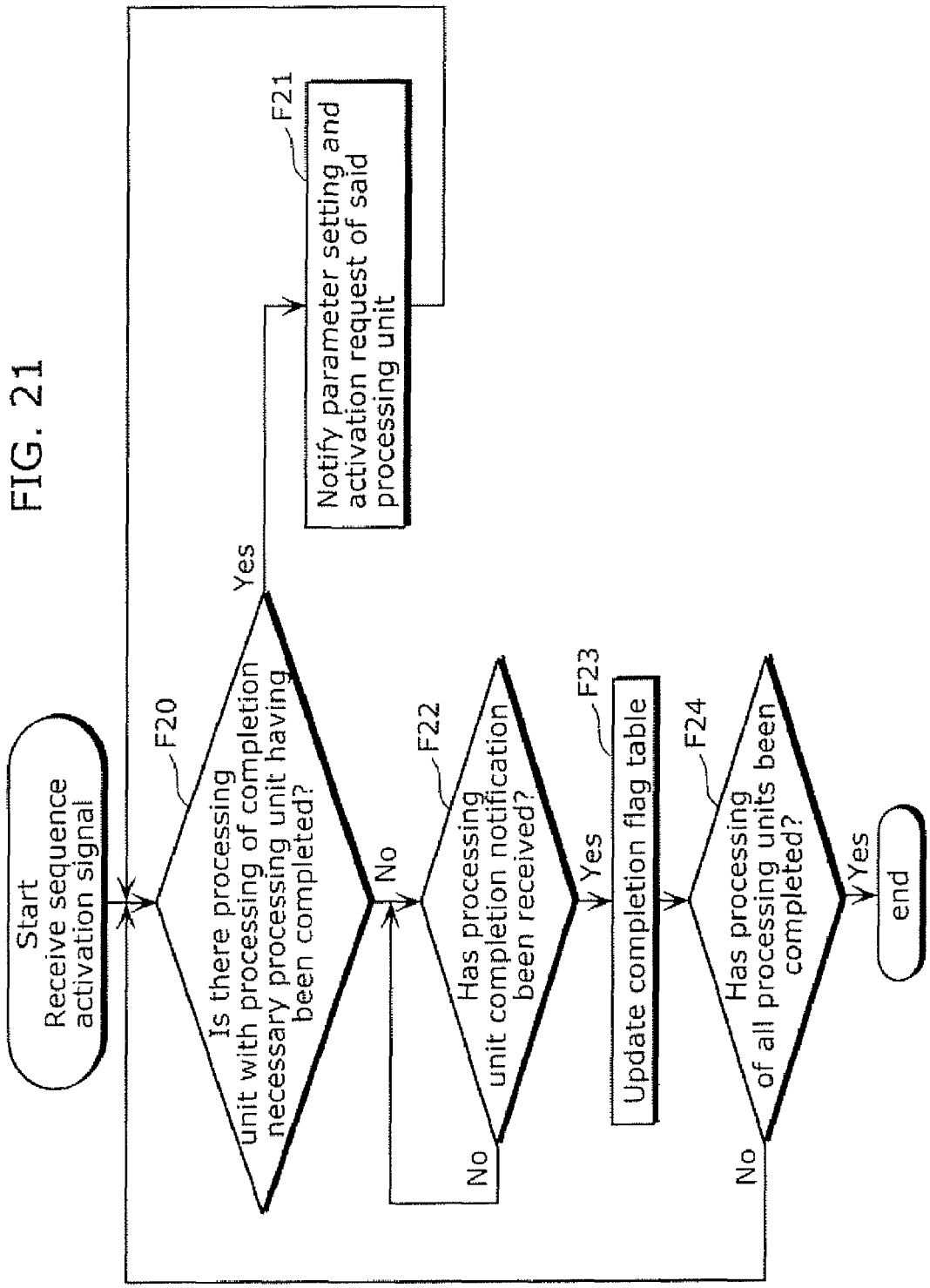
FIG. 21 is a flowchart showing operation of a sequence control unit in Embodiment 5 of the present invention.

Operation of the sequence management unit 110 for activating the processing unit is described with reference to FIG. 21. First, when the sequence activation signal 153 is received, the completion dependence table 501 and the completion flag table are referred to in F20, and it is determined whether there is present the processing unit with processing of its completion necessary processing unit having been completed. When such a processing unit is present, parameter setting and an activation request are notified for the processing unit in F21, and parameter setting and an activation request are notified for every processing unit with processing of its completion necessary processing unit having been completed. When there is not present the processing unit with processing of its completion necessary processing unit having been completed, receipt of the processing unit completion signal of the processing unit activated is waited in F22. When the processing unit completion signal is received in F23, the completion flag table of the processing unit completed in F23 is brought into a completed state, and F20 to F24 are repeated until all the processing units come into completed states.

Figure 22:
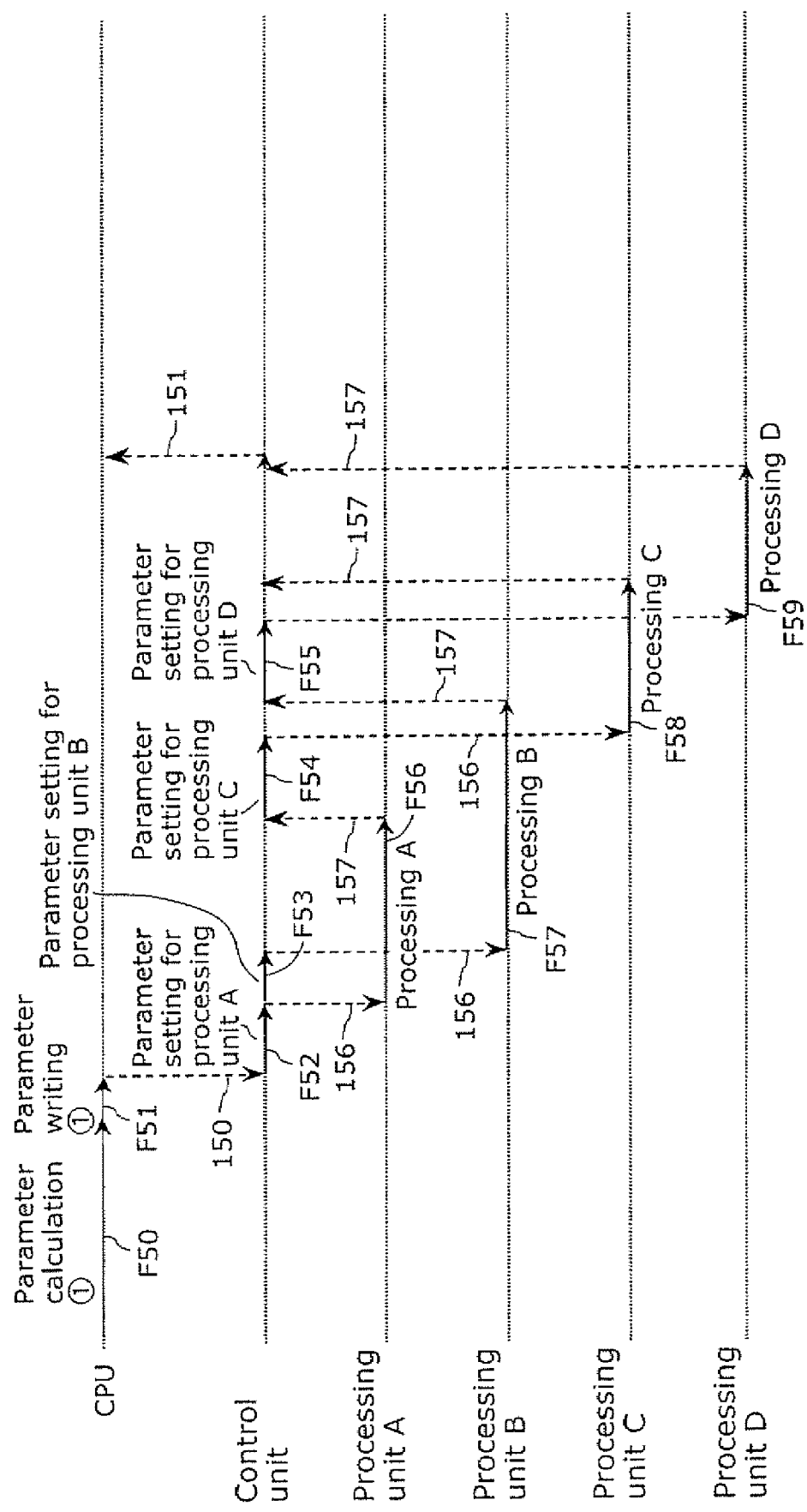
FIG. 22 is a view showing operational timings of a CPU, a control unit, and each of processing units in Embodiment 5 of the present invention, in a case where processing of a processing unit A is completed in advance of that of a processing unit B.

FIG. 22 shows operations of the CPU 101, the control unit and each of the processing units when processing of the processing unit A104 is completed in advance of processing of the processing unit B in Embodiment 5. When processing of the processing unit A104 is completed, the processing unit C106 with its completion necessary processing unit being the processing unit A104 is activated. Similarly, when processing of the processing unit B105 is completed, the processing unit D107 is activated. The processing units are activated in the order of the processing unit A104, the processing unit B105, the processing unit C106, and the processing unit D107.

Figure 23:
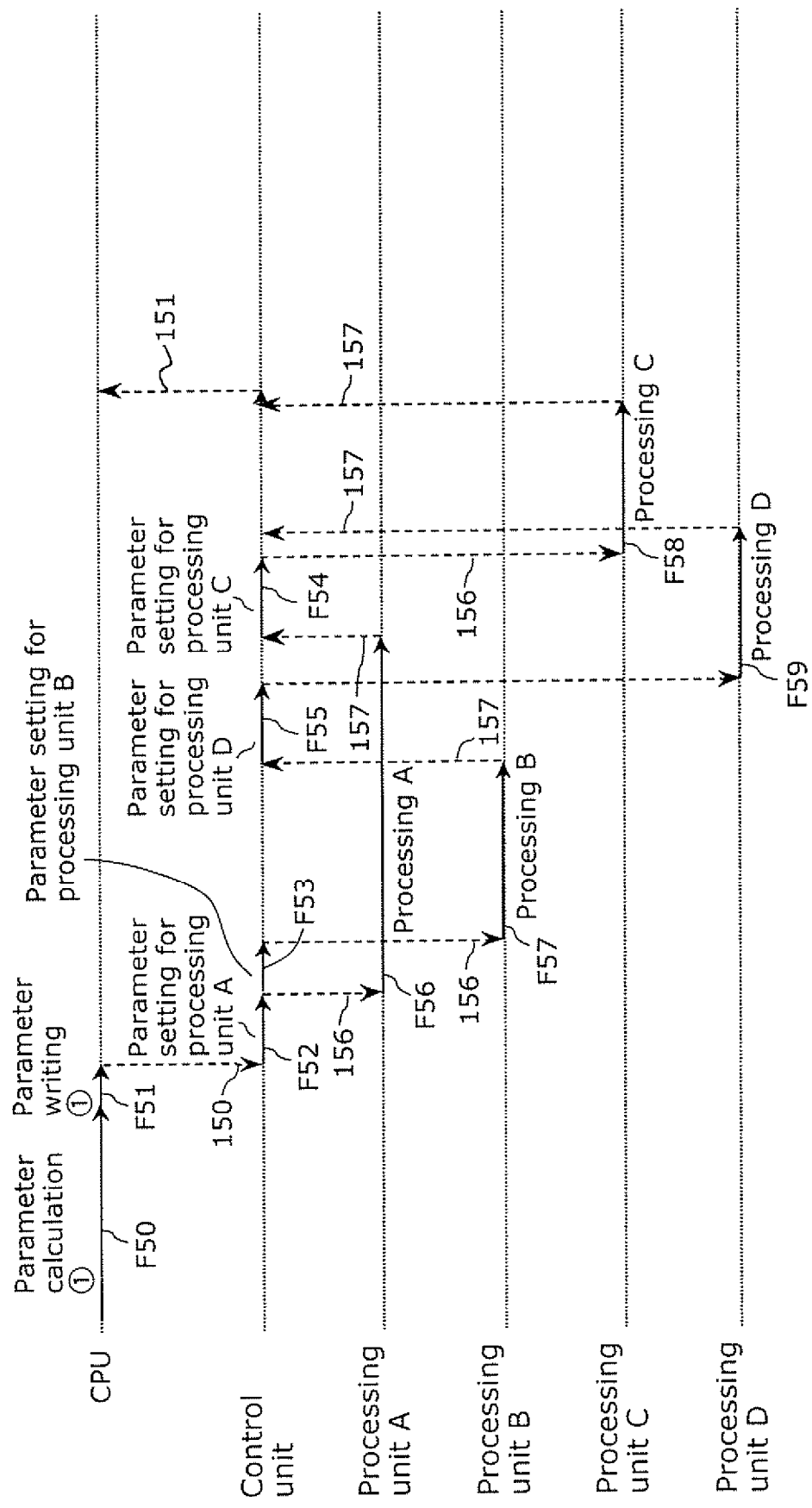
FIG. 23 is a view showing operational timings of the CPU, the control unit and each of the processing units in Embodiment 5 of the present invention, in a case where processing of the processing unit B is completed in advance of that of the processing unit A.

FIG. 23 shows operations of the CPU 101, the control unit and each of the processing units when processing of the processing unit B105 is completed in advance of processing of the processing unit A in Embodiment 5. Similarly to FIG. 22, the processing unit C106 is activated when processing of the processing unit A104 is completed, and the processing unit D107 is activated when processing of the processing unit B105 is completed. However, since processing of the processing unit B105 is completed in advance of processing of 104, the processing units are activated in the order of the processing unit A104, the processing unit B105, the processing unit D107, and the processing unit C106.

It is possible by this method to dynamically change the activation order of each of the processing units according to the timing for processing completion of each of the processing units, so as to shorten the idle time of the processing units, leading to improvement in processing performance.

It is to be noted that, while only one completion necessary processing unit is present in Embodiment 5 for the sake of description, a plurality of completion necessary processing units may be present.

Embodiment 6

Figure 24:
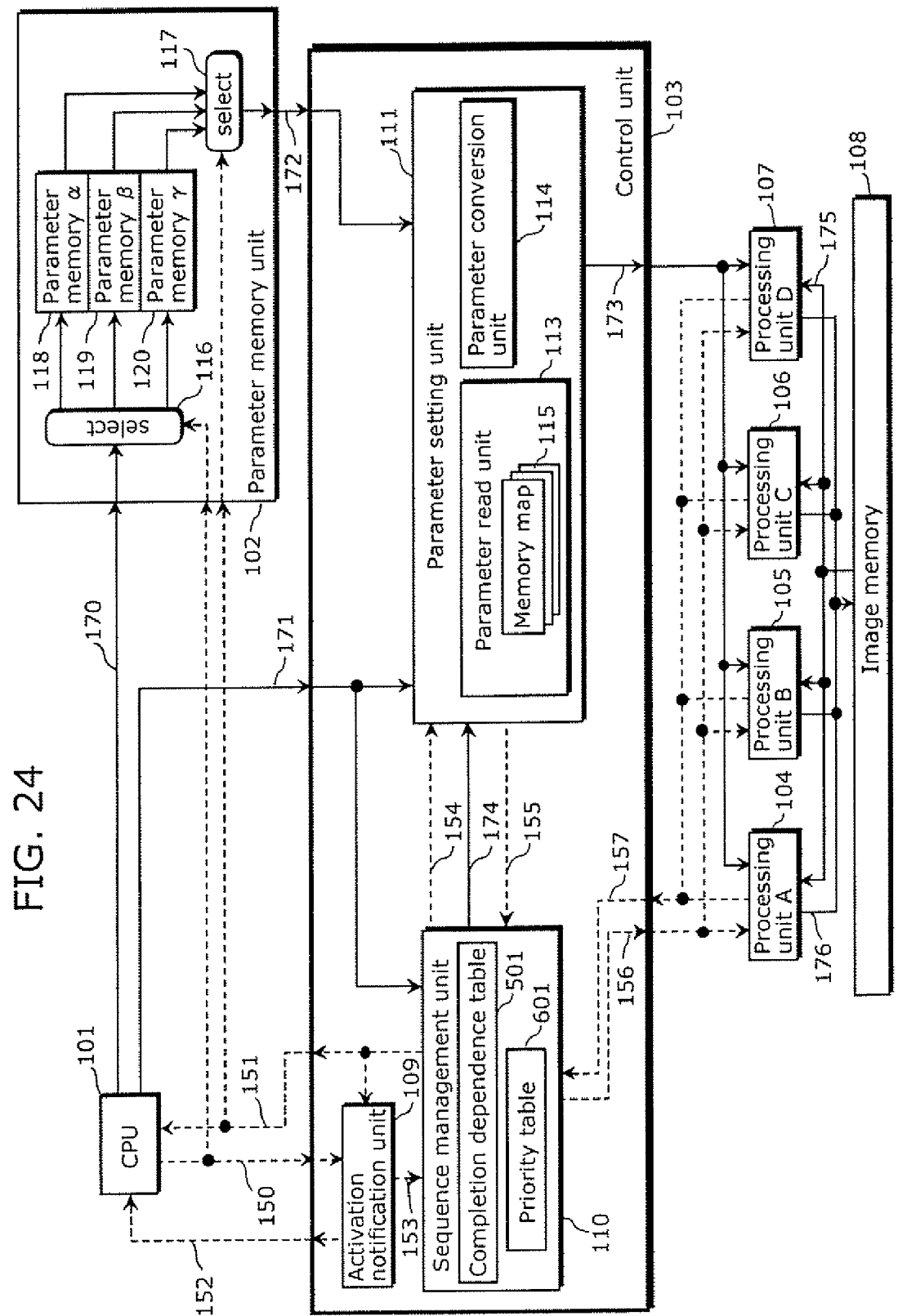
FIG. 24 is a block diagram showing a configuration of an image processing apparatus in Embodiment 6 of the present invention.

FIG. 24 is a block diagram showing a configuration of an image processing apparatus according to Embodiment 6 of the present invention. In FIG. 24, the same elements as in FIG. 18 are provided with the same symbols as in FIG. 18, and the description thereof is omitted. In Embodiment 6, a priority table 601 is present.

The sequence management unit 110 specifies activation for the processing unit with processing of its completion necessary processing unit having been completed, as in Embodiment 5. When there are present a plurality of processing units with processing of their completion necessary processing units having been completed, in Embodiment 6, the priority table 601 is referred to, and the processing unit with higher priority is activated in advance. FIGS. 25 and 26 show a completion dependence table 501 and a priority table 601. The priority table 601 is set depending upon the number of processing units subject to the completion necessary processing units. For example, the processing unit A104 has a priority of 2 as being the completion necessary processing unit of the processing unit B105 and the processing unit C106.

Figure 27:
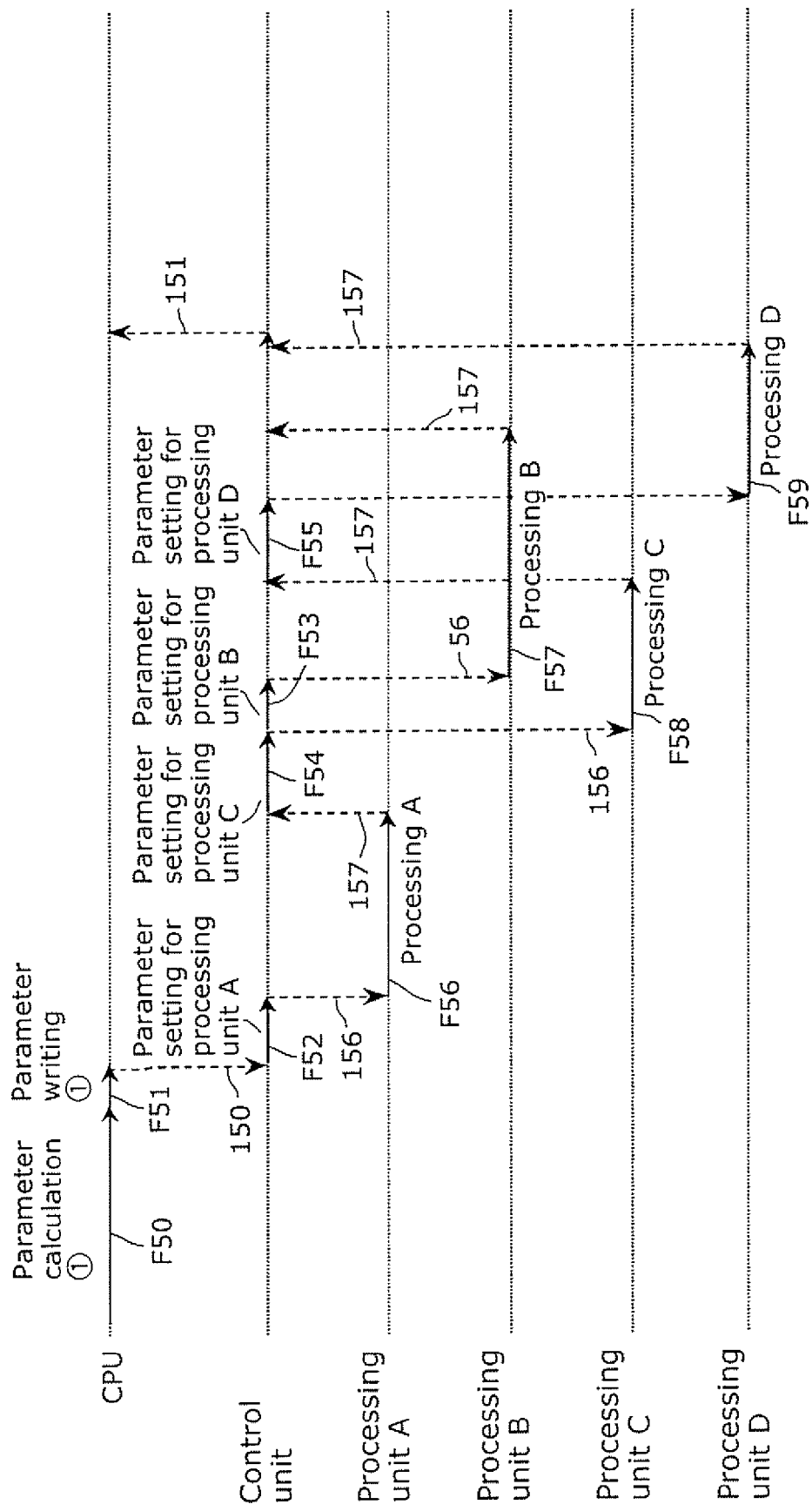
FIG. 27 is a view showing operational timings of a CPU, a control unit, and each of processing units in Embodiment 6 of the present invention.

FIG. 27 shows operations of the CPU 101, the control unit 103 and each of the processing units in Embodiment 6. When processing of the processing unit A104 is completed, activation of the processing unit B105 and the processing unit C106 becomes possible, but since the processing unit C106 has higher priority, the processing unit C106 is activated in advance of the processing unit B105.

It becomes possible by this method to shorten processing time of the entire system, leading to improvement in processing performance.

Embodiment 7

Figure 28:
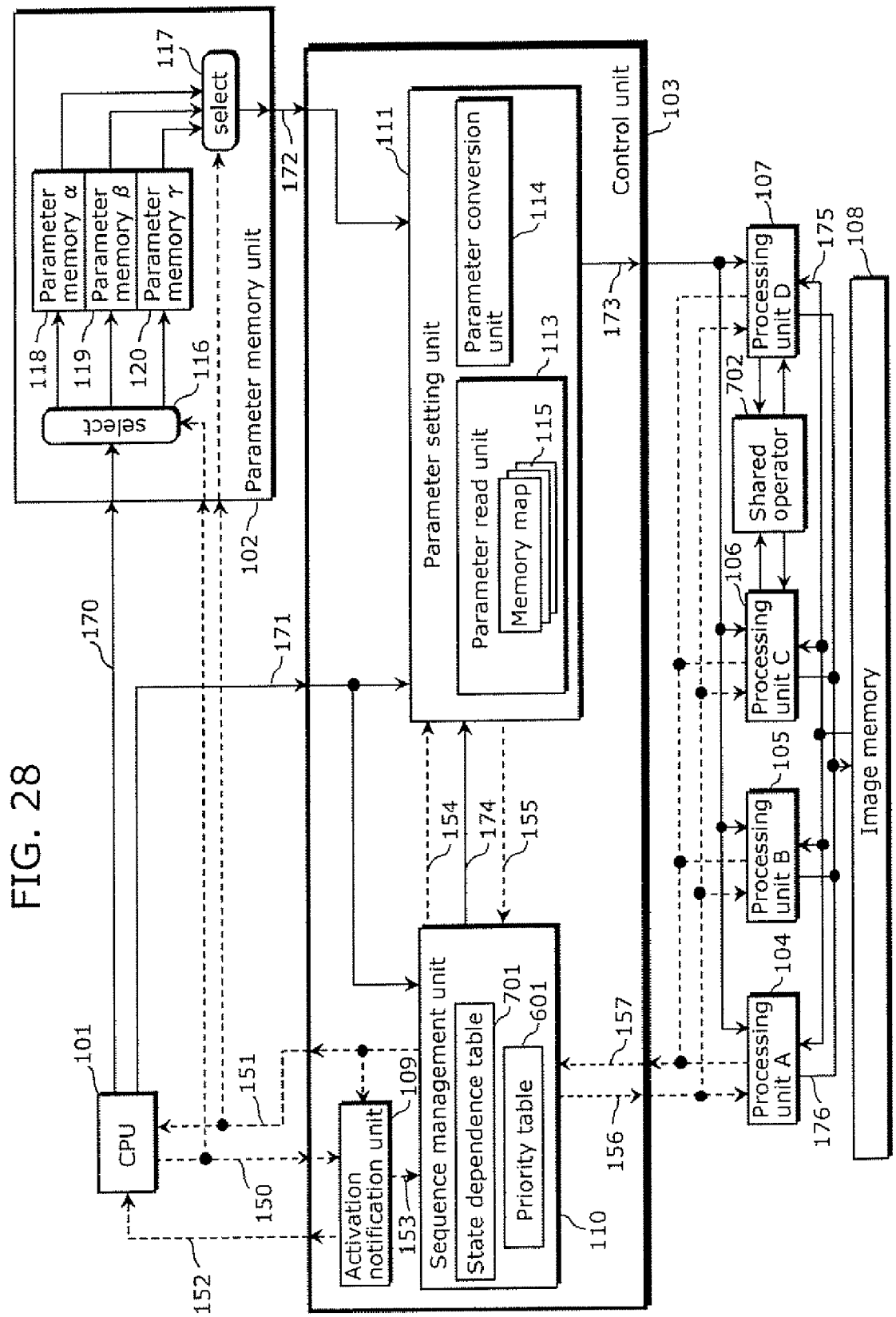
FIG. 28 is a block diagram showing a configuration of an image processing apparatus in Embodiment 7 of the present invention.

FIG. 28 is a block diagram showing a configuration of an image processing apparatus according to Embodiment 7 of the present invention. In FIG. 28, the same elements as in FIG. 24 are provided with the same symbols as in FIG. 24, and the description thereof is omitted. In Embodiment 7, the completion dependence table is not present, but a state dependence table 701 is present. Further, the processing unit C106 and the processing unit D107 use a shared operator 702, and the processing unit C106 and the processing unit D107 cannot be operated in parallel.

FIG. 29 shows a state dependence table in Embodiment 7. In the state dependence table 701, as an activation condition, any of preprocessing, processing, and processing completion of another processing unit and the negative states thereof is set. For example, the activation condition of the processing unit C106 is a state where processing of the processing unit A104 has been completed and processing of the processing unit D107 is not being performed. Further, the state of each of the processing units is determined by means of a state flag table stored inside the sequence management unit 110. The state flag table is updated when the sequence management unit 110 notifies a processing unit activation signal and receives a processing unit completion signal, and the processing unit in advance of activation comes into a preprocessing state, the processing unit during processing comes into a processing state, and the processing unit after processing completion comes into a process completion state. When the sequence management unit 110 receives the sequence activation signal 153, the state flag table is initialized and all the processing units come into the preprocessing state. FIG. 30 shows a state flag table in which processing of the processing unit A104 has been completed, processing of the processing unit B105 is being performed, and the processing unit C106 and the processing unit D107 have not been activated.

In a system in which only the completed state was set, there is only a choice that: the completion necessary processing unit of the processing unit C106 is set to the processing unit D107, or the completion necessary processing unit of the processing unit D107 is set to the processing unit C106, and then the activation order of the processing unit C106 and the processing unit D107 is fixed. Hence it has been not possible to dynamically change the activation order of the processing unit according to timing of completion of the processing, but by the above-mentioned method, the problem is solved, to enable reduction in processing time of the entire system.

Embodiment 8

Figure 31:
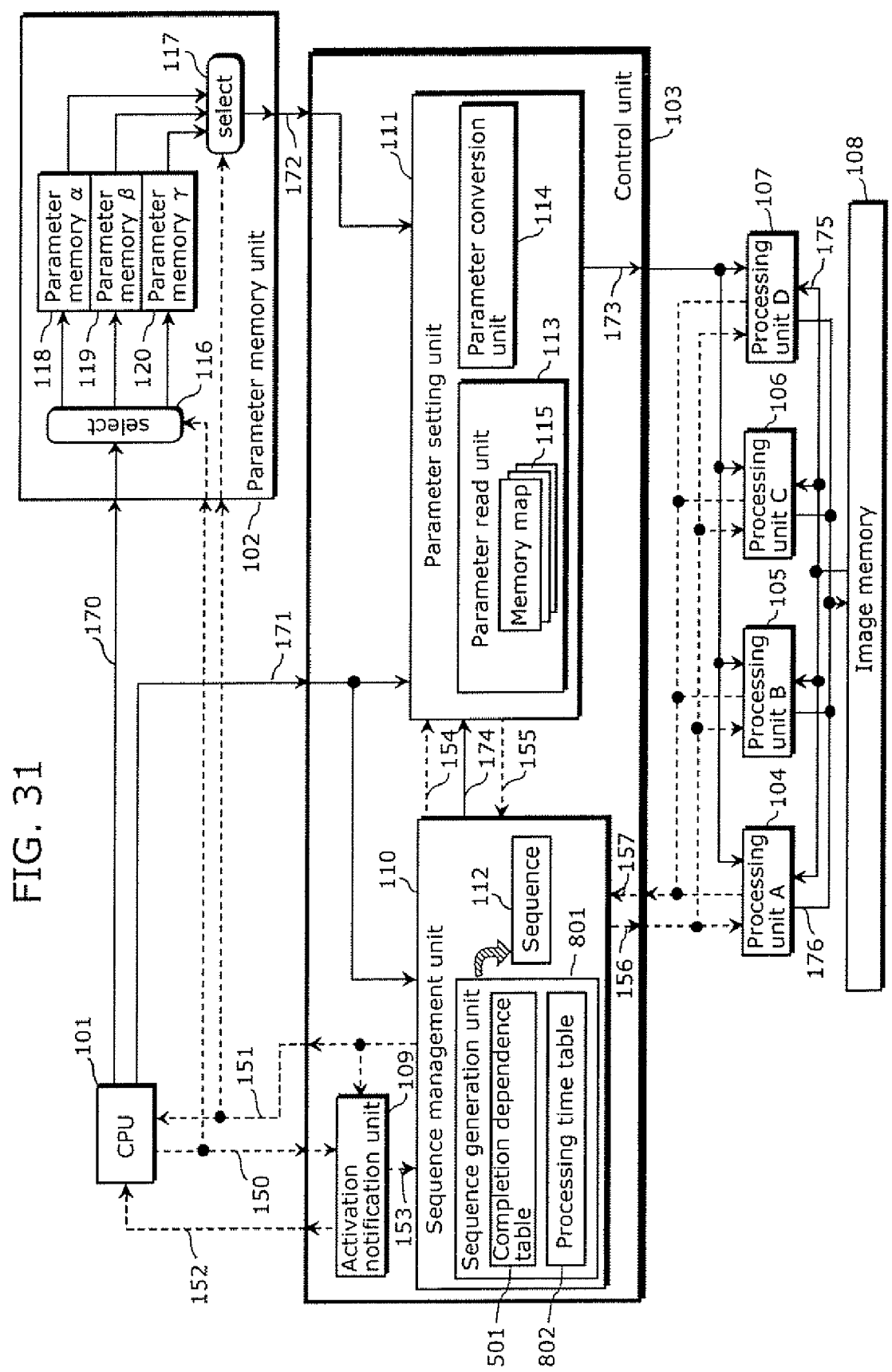
FIG. 31 is a block diagram showing a configuration of an image processing apparatus in Embodiment 8 of the present invention.

FIG. 31 is a block diagram showing a configuration of an image processing apparatus according to Embodiment 8 of the present invention. In FIG. 31, the same elements as in FIG. 1 are provided with the same symbols as in FIG. 1, and the description thereof is omitted. In Embodiment 8, a sequence generation unit 801 is present, and the completion dependence table 501 and a processing time table 802 are present inside the sequence generation unit 801.

In the sequence generation unit 801, when the sequence activation signal 153 is received, a sequence 112 is generated with reference to the completion dependence table 501 and the processing time table 802.

Figure 34:
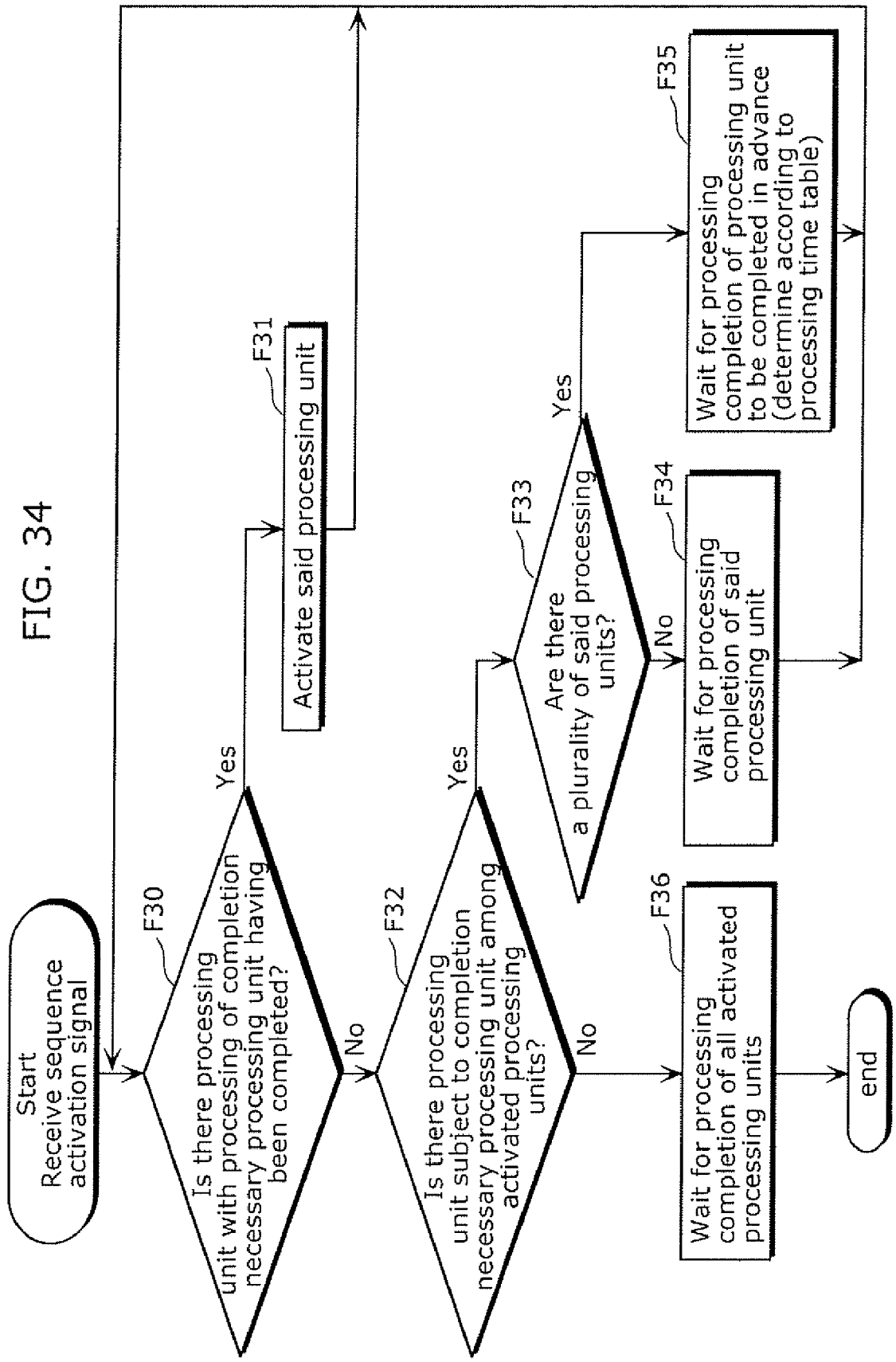
FIG. 34 is a flowchart showing operation of a sequence generation unit in Embodiment 8 of the present invention.

FIG. 35 shows the sequence 112 generated by the sequence generation unit 801. Further, the operation of the sequence generation unit 802 is described with reference to FIG. 34. First, when the sequence activation signal 153 is received, it is determined in F30 whether or not there is present the processing unit with processing of its completion necessary processing unit having been completed. At this time, whether or not processing of the completion necessary processing unit has been completed is determined based upon whether or not the processing of waiting for processing completion of the processing unit has been incorporated into a sequence. For example, processing of the processing unit B is determined as completed at the time of incorporating into the sequence the processing of waiting for processing completion of the processing unit B in the order 3 in FIG. 35. When there is present the processing unit with processing of its completion necessary processing unit having been completed, activation of this processing unit is incorporated into the sequence in F31. When there is no such a processing unit, it is determined in F32 whether or not there is present the processing unit subject to the completion necessary processing unit among the activated processing units. When there is present such a processing unit, it is determined in F33 whether or not there are present a plurality of such processing units, and when there are not a plurality of such processing units, in F34, the processing of waiting for processing completion of the processing unit is incorporated into the sequence. When there are a plurality of such processing units, in F35, the processing time table 802 is referred to and the processing of waiting for processing completion of the processing unit to be completed in advance is incorporated into the sequence. F30 to F35 are repeated, and when the processing unit subject to the completion necessary processing unit is no longer present among the activated processing units, the processing of waiting for processing completion of all the activated processing units is incorporated into the sequence, and the sequence is completed.

It is possible by this method to automatically generate the sequence, to alleviate the load of sequence generation.

It is to be noted that, while only one completion dependence table and processing time table are present in Embodiment 8 for the sake of description, the configuration may be applied where a plurality of those tables are provided, and used as switched according to an order from the CPU 101, as in the case of the sequence in Embodiment 1.

The present invention is useful as a technique for controlling a plurality of processing units in an image processing apparatus to be used for image processing, such as filter computing, and an image codec of a digital video device.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. An image processing apparatus comprising:
a plurality of processing units that shares image processing;
a memory that stores a parameter specifying an operation of each of said processing units; and
a control unit that controls said plurality of processing units,
wherein said control unit includes:
a sequence management unit that stores a sequence table indicating a sequence of activation of and completion of processing by each of said processing units, activates each of said processing units according to the sequence table, and confirms completion of processing by each of said processing units; and
a parameter setting unit that stores a memory map indicating an address of a parameter for each of said processing units, and prior to activation of each of said processing units by said sequence management unit, reads a parameter for each said processing unit to be activated, from said memory unit according to the memory map, and sets the parameter to each said processing unit according to the read result.

2. The image processing apparatus according to claim 1,
wherein said parameter setting unit further converts the parameter read from said memory unit so as to be compatible with an interface of said processing unit, and sets the converted parameter to said processing unit.

3. The image processing unit according to claim 2,
wherein said sequence management unit stores a plurality of sequence tables, selects a sequence table according to an externally input sequence identifier, activates said processing unit according to the selected sequence table, and confirms completion of processing by said processing unit.

4. An image processing unit according to claim 2,
wherein said memory unit includes:
a plurality of memory regions, each storing a parameter corresponding to a sequence; and
a selection unit that selects a memory region for a writing target in a predetermined order among the memory regions, and that selects a memory region for a reading target in a predetermined order among the memory regions.

5. The image processing apparatus according to claim 2,
wherein said control unit further includes
an activation notification unit that queues externally input activation signals, each of the activation signals directing a start of execution of the sequence, and that notifies said sequence management unit of the queued activation signals one by one.

6. The image processing apparatus according to claim 2,
wherein said parameter setting unit stores a plurality of the memory maps, and selects a memory map according to an externally input memory map identifier.

7. The image processing apparatus according to claim 3,
wherein said control unit further includes
an identifier determination unit that stores a table indicating corresponding relations among processing identifiers, sequence identifiers and memory map identifiers, and determines a sequence identifier and a memory map identifier which correspond to an externally input processing identifier,
said sequence management unit selects a sequence table corresponding to the sequence identifier determined by said identifier determination unit, and
said parameter setting unit selects a memory map corresponding to the memory map identifier determined by said identifier determination unit.

8. The image processing apparatus according to claim 3, wherein said memory unit stores sequence identifiers corresponding to parameters, and said sequence management unit reads a sequence identifier from said memory unit, selects a sequence table according to the read sequence identifier, activates each of said processing units according to the selected sequence table, and confirms completion of processing by each of said processing units.

9. The image processing apparatus according to claim 6, wherein said memory unit stores memory map identifiers corresponding to parameters, and said sequence management unit reads a memory map identifier from said memory unit, and selects a memory map according to the identifier.

10. The image processing apparatus according to claim 6, wherein said control unit further includes an identifier determination unit that stores a table indicating corresponding relations among processing identifiers, sequence identifiers and memory map identifiers, and determines a sequence identifier and a memory map identifier which correspond to an externally input processing identifier, said sequence management unit selects a sequence table corresponding to the sequence identifier determined by said identifier determination unit, and said parameter setting unit selects a memory map corresponding to the memory map identifier determined by said identifier determination unit.

11. The image processing apparatus according to claim 2, wherein, when one sequence includes plural activations of a same processing unit, the sequence table and memory map include information for reading a different parameter to said same processing unit.

12. The image processing apparatus according to claim 2, wherein said sequence table indicates, for said plurality of processing units, an order of parameter setting, confirmation of completion of parameter setting, activation, and confirmation of completion of processing.

13. The image processing apparatus according to claim 2, further comprising a sequence generation unit that generates a sequence according to information indicating an activation condition of said processing unit.

14. An image processing apparatus comprising:

a plurality of processing units that shares image processing;

a memory unit that stores a parameter specifying an operation of each of said processing units; and a control unit that controls said plurality of processing units, wherein said control unit includes:

a sequence management unit that stores a completion dependence table indicating completion of processing by another processing unit as an activation condition of each of said processing units, activates each of the processing units according to the completion dependence table, and confirms completion of processing by each of said processing units; and a parameter setting unit that stores a memory map indicating an address of a parameter for each of said processing units, and prior to activation of each of said processing units by said sequence management unit, reads a parameter for each said processing unit to be activated, from said memory unit according to the memory map, and sets the parameter to each said processing unit according to the read result.

15. The image processing apparatus according to claim 14, wherein said sequence management unit stores a priority of each of said processing units, and activates said processing units in order of priority when the activation conditions according to the completion dependence table are identical.

16. An image processing apparatus comprising:

a plurality of processing units that shares image processing;

a memory unit that stores a parameter specifying an operation of each of said processing units; and a control unit that controls said plurality of processing units, wherein said control unit includes:

a sequence management unit that stores a state dependence table indicating a state of another processing unit as an activation condition of each of said processing units, activates each of said processing units according to the state dependence table, and confirms completion of processing by each of said processing units; and a parameter setting unit that reads a parameter from said memory unit according to a memory map indicating an address of a parameter corresponding to said each processing unit to be activated, converts the parameter so as to be compatible with an interface of said processing unit, and sets the converted parameter to said processing unit.

17. The image processing apparatus according to claim 14, wherein said parameter setting unit further converts the parameter read from said memory unit so as to be compatible with an interface of said processing unit, and sets the converted parameter to said processing unit.

18. The image processing apparatus according to claim 14, wherein said memory unit includes:

a plurality of memory regions, each storing a parameter corresponding to a sequence; and a selection unit that selects a memory region for a writing target in a predetermined order among the memory regions, and that selects a memory region for a reading target in a predetermined order among the memory regions.

19. The image processing apparatus according to claim 14, wherein said parameter selling unit stores a plurality of the memory maps, and selects a memory map according to an externally input memory map identifier.

20. The image processing apparatus according to claim 16, wherein said parameter setting unit stores a plurality of the memory maps, and selects a memory map according to an externally input memory map identifier.

* * * * *